(12) United States Patent
Westerman et al.

(10) Patent No.: US 10,437,459 B2
(45) Date of Patent: Oct. 8, 2019

(54) MULTITOUCH DATA FUSION

(75) Inventors: Wayne Carl Westerman, San Francisco, CA (US); John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 1180 days.

(21) Appl. No.: 11/963,516

(22) Filed: Dec. 21, 2007

(65) Prior Publication Data
US 2008/0211766 A1 Sep. 4, 2008

Related U.S. Application Data

(60) Provisional application No. 60/879,152, filed on Jan. 7, 2007.

(51) Int. Cl.
G09G 5/00 (2006.01)
G06F 3/0488 (2013.01)
G06F 3/038 (2013.01)
G06K 9/00 (2006.01)

(52) U.S. Cl.
CPC .......... *G06F 3/04883* (2013.01); *G06F 3/038* (2013.01); *G06K 9/00375* (2013.01); *G06F 2203/0381* (2013.01); *G06F 2203/04808* (2013.01)

(58) Field of Classification Search
CPC ...... G06F 3/038; G06F 3/04883; G06F 3/046; G06F 2200/1637; G06F 2203/04808; G06F 2203/04105; G06F 2203/0381; G06F 1/1694; G06F 17/1643; G06F 17/30811;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000/163031 A 6/2000
JP 2002/342033 A 11/2002
(Continued)

OTHER PUBLICATIONS

International Search Report dated Mar. 9, 2009, for PCT Application No. PCT/US2007/088981, filed Dec. 21, 2007, eight pages.
(Continued)

*Primary Examiner* — Vinh T Lam
(74) *Attorney, Agent, or Firm* — Kubota & Basol LLP

(57) ABSTRACT

A method for performing multi-touch (MT) data fusion is disclosed in which multiple touch inputs occurring at about the same time are received to generating first touch data. Secondary sense data can then be combined with the first touch data to perform operations on an electronic device. The first touch data and the secondary sense data can be time-aligned and interpreted in a time-coherent manner. The first touch data can be refined in accordance with the secondary sense data, or alternatively, the secondary sense data can be interpreted in accordance with the first touch data. Additionally, the first touch data and the secondary sense data can be combined to create a new command.

51 Claims, 17 Drawing Sheets

(58) Field of Classification Search
CPC ........ G06F 2221/2111; G06K 9/00375; G09G 5/00
USPC ................. 345/156, 173–175; 704/275; 178/18.01–18.09
See application file for complete search history.

(56) References Cited

U.S. PATENT DOCUMENTS

| | | | |
|---|---|---|---|
| 5,736,976 A * | 4/1998 | Cheung | G06F 3/0219 341/22 |
| 5,825,352 A | 10/1998 | Bisset et al. | |
| 5,835,079 A | 11/1998 | Shieh | |
| 5,864,808 A | 1/1999 | Ando et al. | |
| 5,880,411 A | 3/1999 | Gillespie et al. | |
| 5,884,249 A * | 3/1999 | Namba | G06F 17/271 704/275 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,445,978 B1 * | 9/2002 | Takamura | A63H 11/00 700/17 |
| 6,545,669 B1 * | 4/2003 | Kinawi | G06F 3/0486 345/1.1 |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 6,888,536 B2 | 5/2005 | Westerman et al. | |
| 7,015,894 B2 | 3/2006 | Morohoshi | |
| 7,030,861 B1 | 4/2006 | Westerman et al. | |
| 7,126,816 B2 | 10/2006 | Krah | |
| 7,184,064 B2 | 2/2007 | Zimmerman et al. | |
| 7,236,156 B2 * | 6/2007 | Liberty | A61B 5/1171 345/158 |
| 7,307,623 B2 * | 12/2007 | Enomoto | G06F 3/0481 345/156 |
| RE40,153 E | 3/2008 | Westerman et al. | |
| 7,339,580 B2 | 3/2008 | Westerman et al. | |
| 7,401,300 B2 * | 7/2008 | Nurmi | G06F 1/1626 345/158 |
| 7,495,659 B2 | 2/2009 | Marriott et al. | |
| 7,521,623 B2 | 4/2009 | Bowen | |
| 7,561,143 B1 * | 7/2009 | Milekic | G06F 3/013 345/156 |
| RE40,993 E | 11/2009 | Westerman | |
| 7,663,607 B2 | 2/2010 | Hotelling et al. | |
| 7,683,888 B1 | 3/2010 | Kennedy | |
| 7,808,479 B1 | 10/2010 | Hotelling et al. | |
| 8,479,122 B2 | 7/2013 | Hotelling et al. | |
| 2004/0093215 A1 | 5/2004 | Gupta et al. | |
| 2004/0111394 A1 * | 6/2004 | Fish | G06F 11/0709 |
| 2004/0119699 A1 * | 6/2004 | Jones | G06F 3/0481 345/173 |
| 2004/0122683 A1 * | 6/2004 | Grossman | G06Q 10/10 715/864 |
| 2005/0078967 A1 * | 4/2005 | Fujimoto | G06F 11/0733 399/8 |
| 2005/0174324 A1 * | 8/2005 | Liberty | G06F 3/017 345/156 |
| 2005/0243054 A1 * | 11/2005 | Beymer | A61B 3/0033 345/156 |
| 2005/0246604 A1 * | 11/2005 | Fujimoto | G06F 11/0733 714/742 |
| 2006/0017692 A1 * | 1/2006 | Wehrenberg | G06F 1/1616 345/156 |
| 2006/0022955 A1 | 2/2006 | Kennedy | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0028429 A1 * | 2/2006 | Kanevsky | G06F 3/011 345/156 |
| 2006/0033724 A1 | 2/2006 | Chaudhri et al. | |
| 2006/0044259 A1 | 3/2006 | Hotelling et al. | |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0161871 A1 | 7/2006 | Hotelling et al. | |
| 2006/0181517 A1 | 8/2006 | Zadesky et al. | |
| 2006/0193004 A1 * | 8/2006 | Wasilewski | H04N 1/00127 358/1.15 |
| 2006/0197750 A1 | 9/2006 | Kerr et al. | |
| 2006/0197753 A1 | 9/2006 | Hotelling | |
| 2006/0236263 A1 * | 10/2006 | Bathiche | G06F 3/016 715/786 |
| 2006/0241864 A1 * | 10/2006 | Rosenberg | G06F 3/04883 701/469 |
| 2007/0036347 A1 * | 2/2007 | Teicher | H04M 1/72519 379/418 |
| 2007/0040799 A1 * | 2/2007 | Singh | G06F 3/013 345/156 |
| 2007/0164990 A1 * | 7/2007 | Bjorklund | G06F 3/017 345/156 |
| 2008/0148030 A1 * | 6/2008 | Goffin | G06F 9/44505 713/1 |
| 2008/0158144 A1 * | 7/2008 | Schobben | G06F 1/3203 345/156 |
| 2008/0165022 A1 * | 7/2008 | Herz et al. | 340/669 |
| 2008/0191864 A1 * | 8/2008 | Wolfson | G06F 3/011 340/524 |
| 2009/0140991 A1 * | 6/2009 | Takasaki et al. | 345/173 |
| 2009/0175491 A1 * | 7/2009 | Charpentier | G06K 9/00885 382/100 |
| 2009/0231270 A1 * | 9/2009 | Vartiainen | G06F 1/1626 345/156 |
| 2011/0199196 A1 * | 8/2011 | Shin | G08C 17/02 340/13.25 |
| 2012/0212411 A1 * | 8/2012 | Oh | G06F 3/0202 345/157 |

FOREIGN PATENT DOCUMENTS

WO WO-2008/085759 A2 7/2008
WO WO-2008/085759 A3 7/2008

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

HAND PROFILE

CONTACT PROFILE

MULTITOUCH DATA FUSION

CROSS-REFERENCE TO RELATED APPLICATIONS

This application claims the benefit of U.S. Provisional Application No. 60/879,152, filed Jan. 7, 2007, which application is specifically incorporated herein, in its entirety, by reference.

FIELD OF THE INVENTION

This relates to systems utilizing multi-touch sensitive input devices and other input devices, and more particularly, to the combining of multi-touch input data with data from other input devices to gain an advantage thereby increasing the efficiency and performance of inputting operations.

BACKGROUND OF THE INVENTION

Systems may have multiple input means. However, each input means is typically operated independently of each other in a non seamless way. There is no synergy between them. They do not work together or cooperate for a common goal such as improving the input experience.

SUMMARY OF THE INVENTION

While the fingertip chording and movement data generated by multi-touch input devices can provide a strong set of user control means, additional information from other sensing modalities when combined or fused with the chording and movement data can significantly enhance the interpretative abilities of the electronic device and/or significantly improve the ease of use as well as streamline input operations for the user. Therefore, embodiments of the invention propose the concept of MT data fusion, which is defined as the combination of data from one or more independent sensing modalities with chording and movement data from a MT sensor in order to improve the operation and use of an electronic device.

There are a number of independent sensing modalities that when fused with Multi-touch chording and movement data provide enhanced performance and use of electronic devices. The sources of independent sensing data fall into several categories: (1) those that measure some aspect of the user's body state, (2) those that measure data from the environment, which could include sensing data from other individuals, and (3) those that measure some aspect of the state of the electronic device.

In accordance with one embodiment, one or more of these independent data sources can be fused temporally with movement and chording data from a multi-touch sensor to significantly enhance the performance and use of electronic devices. The information flowing from the various sources can be combined or fused such that events in each data stream are time aligned with each other. As such, the multiple data streams can be properly understood in conjunction with the other.

In accordance with other embodiments, the results of voice recognition and speech understanding can be fused with multi-touch movement data in such a way as to significantly enhance electronic device performance. The contact size and contact separation of touch data along with finger identification data (such as from a camera) can allow the multi-touch system to make guesses concerning finger identification of the touch data. Gaze vector data (the determination of a user's gaze) can be fused with touch data and/or objects appearing on a display to perform various operations such as object movement or selection. The fusion of device dynamics data (e.g. movement data) with multi-touch movement data can result in a smoothing out (i.e., improved filtering) of unintended finger motion due to the means of traveling (e.g., vibrations and jolts).

Biometric inputs include, but are limited to, hand size, fingerprint input, body temperature, heart rate, skin impedance, and pupil size. Typical applications that might benefit from the fusion of biometric data with multi-touch movement data would include games, security, and fitness related activities. Facial expressions conveying emotional state can also be fused advantageously with multi-touch movement data during creative activities such as music composition.

DETAILED DESCRIPTION OF THE PREFERRED EMBODIMENT

Figure 1:
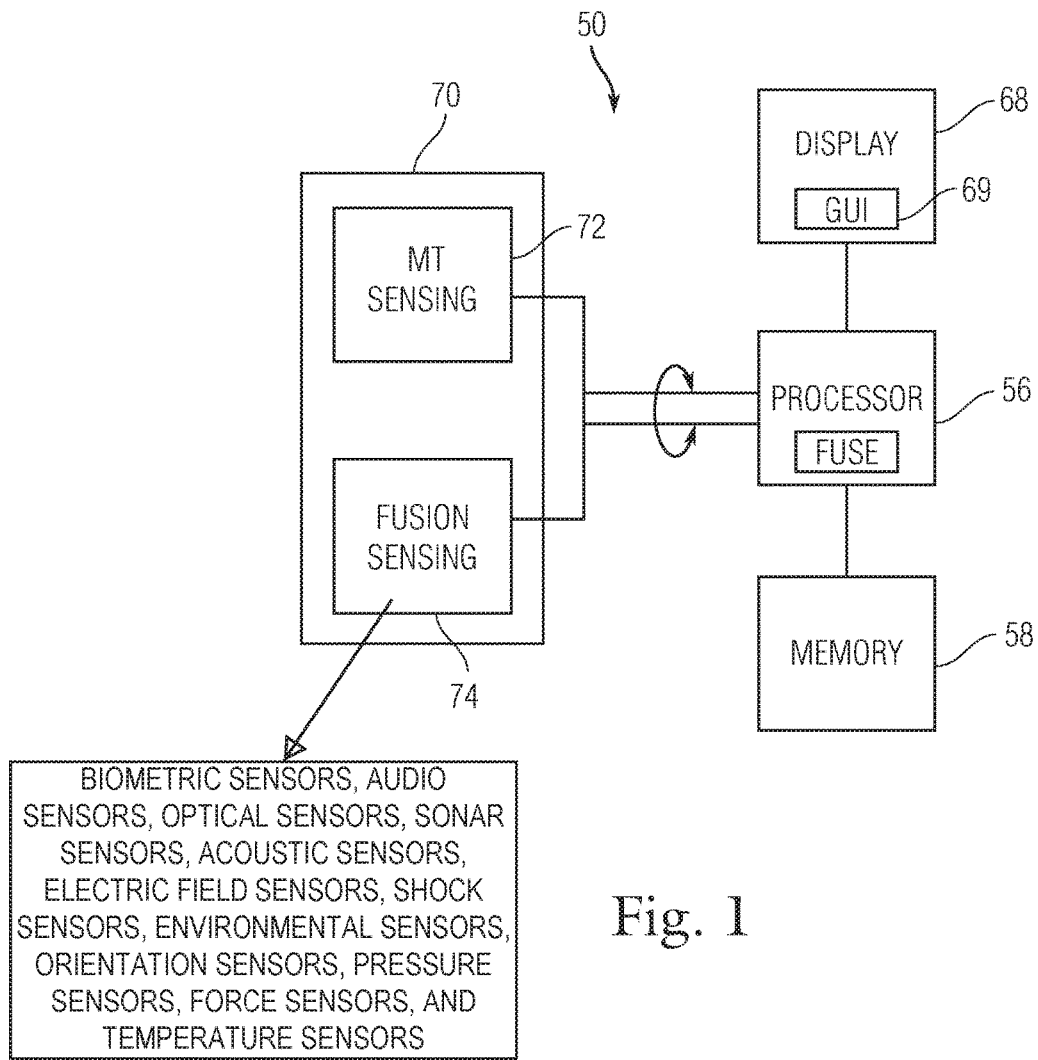
FIG. 1 is a block diagram of an electronic device or system utilizing multi-touch (MT) data fusion in accordance with one embodiment of the present invention.

Embodiments of the present invention propose combining or fusing multi touch sensing with other sensing modalities to gain an advantage thereby increasing the efficiency and performance of inputting operations.

In Multi-touch 2D sensing, as used as the primary or secondary means to allow a user to control the function and operation of an electronic device, the positions of all finger tips in contact or close proximity to a sensing surface are tracked and recorded. The arrangement of contacts (e.g., chords) and the movement of the contacts (e.g., gestures) at or near the sensing surface are interpreted by the electronic device as commands from the user meant to modify, initiate, or terminate a function performed by the electronic device.

While the fingertip chording and movement data provides a strong set of user control means, additional information from other sensing modalities when combined or fused with the chording and movement data could significantly enhance the interpretative abilities of the electronic device and/or significantly improve the ease of use as well as streamline input operations for the user. Therefore, embodiments of the invention propose the concept of MT data fusion, which is defined as the combination of data from one or more independent sensing modalities with chording and movement data from a MT sensor in order to improve the operation and use of an electronic device.

There are a number of independent sensing modalities that when fused with Multi-touch chording and movement data provide enhanced performance and use of electronic devices. The sources of independent sensing data fall into several categories: (1) those that measure some aspect of the user's body state, (2) those that measure data from the environment, which could include sensing data from other individuals, and (3) those that measure some aspect of the state of the electronic device. By way of example, the sense data may include, but are not limited to, the fusion of voice, finger identification, gaze vector, facial expression, handheld device dynamics, and biometrics such as body temperature, heart rate, skin impedance, and pupil size. It should be noted that embodiments of this invention are not directed at individual sensing means. They are directed, instead, at the temporal fusion of data from existing sensing means with multi-touch movement and chording data to enhance electronic device ease of use and performance.

In accordance with one embodiment, one or more of these independent data sources can be fused temporally with movement and chording data from a multi-touch sensor to significantly enhance the performance and use of electronic devices. Generally, temporal fusion signifies an apparent coming together of several events in time (multiple sets of data) within a single individual context (computer application, mode or platform). More specifically, in temporal fusion, the data from multiple sources (MT+other sensing modality) is interpreted in a time coherent manner. The information flowing from the various sources are combined or fused such that events in each data stream are time aligned with each other. As such, the multiple data streams can be properly understood in conjunction with the other.

Some examples of MT data fusion are given below.

Voice Fusion

Voice input, speech recognition, and language understanding all fall under the long-sought goal of enabling electronic devices to perform their intended function directed by human speech. In recent years, much progress has been made in enabling the recognition of speech by electronic devices. Language understanding, being much more difficult, has not enjoyed the same level of success. Embodiments of the invention described herein are not concerned with how voice data is recognized or understood. Embodiments of this invention simply make use of the results of voice recognition and, eventually, speech understanding as independent sensing inputs to be fused with multi-touch movement data in such a way as to significantly enhance electronic device performance.

There are a large number of examples where voice and multi-touch can be fused to add significant benefit to an application. The most benefit is gained when voice and multi-touch use is partitioned where they are maximally effective. In other words, voice input is applied to actions poorly served by manual input and manual input handles tasks poorly served by voice. For example, mode selection or static commands are more efficiently done using voice input while moving objects on the screen is best done manually with MT. One example will now be given. In the editing of, say, a mechanical drawing the task may be to select and modify the objects making up the drawing. Assume the modification of each object involves resizing, rotation, and color change. Further assume that the task is not a simple scaling or rotational change of each object. The minimum effort, therefore, is expended when the resizing and rotation is done by using multi-touch gestures (i.e., manually) and when the color change is done using voice input. Consider the alternative: Using voice to resize and rotate each object is problematic because a verbal description of the intended size and rotation is difficult to express. Using multi-touch to select a color is typically less efficient than using voice because the color has to be selected by traversing a list. Alternatively or additionally, voice input may be used to insert text in the object.

Finger Identification Fusion

Finger identification means that the fingers currently touching or in close proximity to the multi-touch sensing surface are identified without ambiguity as to their names and the hand (i.e., right, left, owner) they belong to. For example, let's assume the index and middle fingers of the right hand are in contact with a multi-touch surface. Most, if not all, multi-touch sensors cannot unambiguously classify the contacting fingers as index and middle from the right hand. Using contact size and contact separation allows the multi-touch system to make guesses concerning finger identification but the accuracy of the guess is typically not good unless sufficient number of fingers from one hand are in contact with the surface.

The source of independent finger identification data is readily available from a camera such as an over-the-multi-touch surface camera. The camera data shows where the fingers of each hand are relative to the multi-touch XY coordinates. The camera cannot necessarily determine if the fingers are in contact with the touch surface but this is not important since the fused data from the camera and the multi-touch sensor will provide unambiguous finger movement data that includes the vertical (i.e., Z dimension) position of each finger. A typical embodiment of an over-the-multi-touch-surface camera for a notebook computer could be one or more embedded iSight cameras each with a swing mirror that would enable imaging both hands over a multi-touch surface.

Finger painting, where each finger has an assigned color, stroke, or other characteristic, is a simple example of an application that would be significantly enhanced compared to the state-of-the-art by using finger identification with multi-touch data fusion. Without unambiguous finger identification, the application, whether it is finger painting or something else, would not be able to maintain the proper assignment of particular attributes given to a specific finger. For example, if the index finger of the left hand is assigned the color red and the other fingers are assigned different colors the application must be able to determine when the index finger of the left hand is in contact with the surface in order to paint red. Conversely, the application must be able to determine when the red-assigned finger is not in contact with the surface. The fusion of finger identification data with multi-touch movement data allows the application to function without error.

Gaze Vector Fusion

Over the last twenty years there has been a fair amount of research and development in gaze directed user interfaces. Most of the effort has been focused on providing computer interface solutions to people with disabilities who are not able to use a keyboard or mouse. Research has also been done on using gaze direction in virtual reality applications. As with the other sensing modalities discussed in this disclosure the temporal fusion of gaze direction data with multi-touch movement data can be used to enhance the performance of electronic devices. Therefore, the capture of gaze vector data and the methods for computing gaze direction will not be discussed herein.

There are many possible applications that would benefit from the temporal fusion of gaze vectors with multi-touch movement data. For the purpose of example, one simple application will be discussed here: Consider a typical computer screen, which has several windows displayed. Assume that the user wishes to bring forward the window in the lower left corner, which is currently underneath two other windows. Without gaze vector fusion there are two means to do this, and both involve movement of the hand to another position. The first means is to move the mouse pointer over the window of interest and click the mouse button. The second means is to use a hot-key combination to cycle through the screen windows until the one of interest is brought forward. Voice input could also be used but it would be less efficient than the other means. With gaze vector fusion, the task is greatly simplified. For example, the user directs his gaze to the window of interest and then taps a specific chord on the multi-touch surface. The operation requires no translation of the hands and is very fast to perform.

For another example, assume the user wishes to resize and reposition an iTunes window positioned in the upper left of a display screen. This can be accomplished using a multi-touch system by moving the mouse pointer into the iTunes window and executing a resize and reposition gesture. While this means is already an improvement over using just a mouse its efficiency can be further improved by the temporal fusion of gaze vector data.

Device Dynamics Fusion

Device dynamics include the forces acting on a mobile or hand-held electronic device that result in translations in space and rotations about the device's principal axes. Rotations about the principal axes can be described as roll, yaw, and pitch while the translation of the device can be considered relative to the body of the user.

One can envision a number of applications for mobile or hand-held electronic devices that would benefit from the temporal fusion of device dynamics with multi-touch movement data. These applications would include, but not limited to, those that require a high level of interaction between the user and the application, as with, for example, games. Non-game applications could also benefit from the fusion of device dynamics with multi-touch movement data. For example, while trying to use a multi-touch user interface under highly dynamic conditions such as found when riding in an airplane or walking. In cases like these the fusion of device dynamics with multi-touch movement data could result in a smoothing out (i.e., improved filtering) of unintended finger motion due to the means of traveling (e.g., vibrations and jolts), As another example, we cite an application that involves the temporal fusion of the position of the device relative to the user's body with multi-touch sensor data. The example application is a multi-touch cell phone with its user-side surface almost completely taken up by a multi-touch sensor. The task is to determine whether the cell phone is relative to the user's body in order to enable the appropriate device function. For example, when the phone is far away from the user's ear and being held in a facing up position the multi-touch sensor input would be interpreted as finger movement data which is used to control some aspect of the device, for example, volume or selection from a list. In other positions, say, when the device is near the ear the multi-touch sensor input would be interpreted as image data and used to disable movement control. Alternatively, the image data of the device near the ear could be used to adjust some device aspect such as output volume, which could be changed depending on how close the ear is to the multi-touch surface.

Biometrics Fusion

Biometric inputs include, but are limited to, hand size, fingerprint input, body temperature, heart rate, skin impedance, and pupil size. Typical applications that might benefit from the fusion of biometric data with multi-touch movement data would include games, security, and fitness related activities.

Hand characteristics such as size, shape, and general morphology can be used to identify an individual for the purpose of allowing access to secured areas, including computer systems. While hand characteristics alone would not provide a sufficient level of identity verification, it could be the first door through which a user must pass before other security measures are applied. The fusion of physical hand characteristics with multi-touch movement data (e.g., a trajectory signature) would offer benefits to the initial screening process of typical security systems.

Facial Expression Fusion

As with speech, there is much research on the machine analysis and interpretation of facial expressions. Like the other sensing modalities, embodiments of the invention propose the fusion of facial expression data with multi-touch movement data and not the analytical methods used. Facial expressions convey emotional state that could be fused advantageously with multi-touch movement data during creative activities such as music composition. Other activities such as the detection of impending problems via facial recognition could be fused with multi-touch data to correct the course of events as described in the following example.

A simple example of the benefit derived from the fusion of emotional state, as identified by facial expression, with multi-touch movement data illustrates the possible utility of this method. As with all computer systems, and many electronic devices, there exists, especially for novice users, a certain level of frustration when attempting to complete some operation. The source of the frustration can be attributed to faults in the application, ignorance of the user, or both. When the frustration is due only to the user's ignorance he would typically be unaware of his role in causing the problem. Rather than lay blame on machine or himself, the typical user would mostly be interested in resolving the problem and moving on to complete the task he set out to do. Remedial action by the machine could be initiated automatically if only the machine understood the emotional state of the user.

As discussed above, a novice user may experience frustration from time to time when learning how to perform some task with an electronic device. For example, let's say that the user is trying to scroll through a document using a two-finger vertical movement (gesture). Scrolling, however, is not working for him because he is unknowingly touching the surface with three fingers instead of the required two. He becomes frustrated with the "failure" of the device. However, in this case, the system recognizes the frustration and upon analyzing the multi-touch movement data concludes he is trying to scroll with three fingers. At this point, the device could bring the extra-finger problem to the attention of the user or it could decide to ignore the extra finger and commence scrolling. Subsequent emotional data via facial recognition would confirm to the system that the correct remedial action was taken.

It should be appreciated that these embodiment/examples are given by way of example and not by way of limitation. Other sensing modalities can be utilized as for example force sensing. Force sensing could be used to help interpret hard and light touches so as to discount or filter out a dropped finger that is not part of a chord or gesture. Because the dropped finger is simply that, it does not apply as much force as the finger implementing the gesture. Force sensing could also be used in 3D modeling applications to adjust the Z position of some object.

It should also be noted that other examples for each of the fission embodiments mentioned above can be contemplated. For example, gaze vector may be used to select a displayed object while MT sensing may be used to enter a command that modifies the displayed object. In one example, the computer may provide a grouping of photos. The user may gaze at a particular photo and perform a find gesture that causes the application to look for photos with similar characteristics or attributes.

It should further be noted that embodiments of the invention are not limited to only one fused sensing modality and that multiple sensing modalities may be used. For example, gaze sensing and voice input may be used to supplement MT data during an inputting sequence. For example, while manipulating a first object with MT data, a user can look at another object and say green to effect a color change of the second object.

Embodiments of the invention are directed at improvements to the operation and use of touch-sensitive devices such as single touch or Multi-touch (MT) devices. MT devices are configured to recognize multiple points of contact on a near a surface at the same time. The arrangement of contacts, which are sometimes referred to as chords, and the motions thereof, which are sometimes referred to as gestures, can be used to generate a large number inputs including for example static and manipulative commands.

MT devices have advantages over conventional single point sensing touch devices in that they can distinguish more than one object (finger). Single point devices are simply incapable of distinguishing multiple objects. In most cases, MT devices monitor a sensing surface for a touch or near touch, and when a touch occurs determines the distinct areas of contact and identifies the contacts via their geometric features and geometric arrangement. Once identified or classified, the contacts are monitored for various motions, actions or events. The contacts and motions thereof are then converted into inputs for controlling some aspect of an electronic device.

MT devices can be embodied in various forms including but not limit to standard touch pads, large extended palm pads, touch screens, touch sensitive housings, etc. Furthermore, MT devices can be placed in various electronic devices including but not limited to computers such as tablet computers, laptop computers, desktop computers as well as handheld computing devices such as media players (e.g., music, video, games), PDAs, cell phones, cameras, remote controls, and/or the like. The MT devices may also be placed on dedicated input devices such as touch screen monitors, keyboards, navigation pads, tablets, mice, and the like. Essentially, MT devices can be applied to any surface, and may be found in any consumer electronic product that requires inputs.

Because MT devices provides a plethora of inputting operations at a single location (input surface), inputting with MT devices can be very efficient. The user can maintain their hand(s) at the MT surface without having to move their hand(s) to address other input devices. For example, conventional systems typically include a keyboard and a separate mouse. In order to use the mouse, the user must move their hand from the keyboard and onto the mouse. In order to keyboard efficiently (both hands), the user must move their hand from the mouse to the keyboard. This inputting sequence is very inefficient. For one, only one device can be used effectively at a given time. For another, there is wasted time between each inputting step. In contrast, with MT surfaces the user can generate both static commands (e.g., keyboarding) and manipulative commands (e.g., tracking) from the same location and at the same time. The user therefore does not have to move their hands to perform different inputting tasks. The user simply provides different chords or finger motions to generate a plethora of inputs either sequentially or simultaneously. In one example, the user may provide key commands with taps at specific locations of the MT surface while allowing tracking from all locations of the MT surface.

Although input efficiency is greatly enhanced with MT devices, MT devices still have some limitations. For one, MT sensing may produce data that is ambiguous or unclear. For example, while it may be great at determining the number of contacts, it may have a difficult time ascertaining the exact identity of the contact (e.g., which finger). This is especially true when there are only a limited number of contacts being detected. For another, in MT operations, there are typically a maximum number inputs based on various chords, and finger motions.

Therefore, in accordance with one embodiment, the invention proposes utilizing secondary sensing or input mechanisms or systems to help interpret the MT data. In so doing, the inputs associated therewith can be improved and even expanded. For example, by clearly identifying each contact in an arrangement of contacts, more chords and gestures can be created. The input language is no longer limited to number of contacts, and can be expanded to include a specific fingers or arrangement of fingers (e.g., thumb, index, ring, middle, pinky, palm, etc.).

In addition, in some situations, the MT sensing data may not be as precise as it should or needs to be top operate flawlessly. For example, inaccurate or course recognition of contacts and movements may lead to undesirable results. By way of example, the user's action may be interpreted as something that it is not. The user may become annoyed or not trust the device and as a result stop using the device. Therefore, secondary sensing devices may be used to correct, filter, smooth or otherwise positively improve the MT data so as to enhance the performance of the inputs provided by the MT device.

In accordance with another embodiment, the invention proposes utilizing secondary sensing or input mechanisms or systems to supplement the MT operations so as to improve the overall MT inputting experience. For example, the number of inputs may be further increased. As mentioned, MT devices allow a user to implement a plethora of inputs. In order to do this, however, the user typically maintains their hands near or at the MT surface. Moving a hand(s) away from the surface reduces the number of available inputs and thus the efficiency. Thus, secondary sensing or input mechanism or systems that allow the hand(s) to stay near the MT surface may be used. For example, mechanisms or systems either (1) capable of sensing proximate the MT surface and/or (2) capable of sensing something other than a hand (hands free inputting). Examples of the former may for example include force sensing, image sensing, optical sensing, position sensing, motion sensing, biometric sensing and/or like at the MT surface. Examples of the later include voice recognition systems, gaze vector systems, biometric systems, device dynamics sensing, environmental sensing, and/or the like.

Additional details on implementations of touch devices including MT devices and operational methods thereof are provided in: (1), U.S. patent application Ser. No. 10/654,108 filed Sep. 2, 2003, entitled "AMBIDEXTROUS MOUSE"; (2) U.S. patent application Ser. No. 10/789,676 filed Feb. 27, 2004, entitled "SHAPE DETECTING INPUT DEVICE"; (3) U.S. patent application Ser. No. 10/840,862 filed May 6, 2004, entitled "MULTIPOINT TOUCHSCREEN"; (4) U.S. patent application Ser. No. 11/115,539 filed Apr. 26, 2005, entitled "HAND HELD ELECTRONIC DEVICE WITH MULTIPLE TOUCH SENSING DEVICES"; (5) U.S. patent application Ser. No. 11/241,839 filed Jul. 30, 2004, entitled "PROXIMITY DETECTOR IN HANDHELD DEVICE"; (6) U.S. Provisional Patent Application No. 60/658,777 filed Mar. 4, 2005 entitled "MULTI-FUNCTIONAL HAND-HELD DEVICE"; (7) U.S. patent application Ser. No. 10/903,964 filed Jul. 30, 2004, entitled "GESTURES FOR TOUCH SENSITIVE INPUT DEVICES"; (8) U.S. patent application Ser. No. 11/038,590 filed Jan. 18, 2005 entitled "MODE-BASED GRAPHICAL USER INTERFACES FOR TOUCH SENSITIVE INPUT DEVICES"; (9) U.S. patent application Ser. No. 11/048,264 filed Jan. 31, 2005 entitled "GESTURES FOR TOUCH SENSITIVE INPUT DEVICES"; (10) U.S. patent application Ser. No. 11/228,737 filed Sep. 16, 2005 entitled "ACTIVATING VIRTUAL KEYS OF A TOUCH-SCREEN VIRTUAL KEYBOARD"; (11) U.S. patent application Ser. No. 11/228,758 filed Sep. 16, 2005 entitled "VIRTUAL INPUT DEVICE PLACEMENT ON A TOUCH SCREEN USER INTERFACE"; (12) U.S. patent application Ser. No. 11/228, 700 filed Sep. 16, 2005 entitled "OPERATION OF A COMPUTER WITH TOUCH SCREEN INTERFACE"; (13) U.S. patent application Ser. No. 10/927,925 filed Aug. 26, 2004 entitled "VISUAL EXPANDER"; (14) U.S. patent application Ser. No. 10/927, 575 filed Aug. 25, 2004 entitled "WIDE TOUCHPAD ON A PORTABLE COMPUTER", (15) U.S. patent application Ser. No: 11/015,434, filed on Dec. 17, 2004, entitled "METHOD AND APPARATUS FOR INTEGRATING MANUAL INPUT," (16) U.S. Pat. No. 6,323,846, (17) Provisional U.S. Patent Application No.: 60/072,509 filed Jan. 26, 1998, (18) Provisional U.S. Patent Application No.: 60/763,605 filed Jan. 30, 2006, entitled GESTURING WITH A MULTIPOINT SENSING DEVICE (19) U.S. patent application Ser. No: 11/057,050, filed on Feb. 11, 2005, entitled "DISPLAY ACTUATOR," (20) U.S. Pat. Nos. 6,677,932, (21) 6,570,557, (20) 7,030, 861, (22) 6,888,536, all of which are herein incorporated by reference.

These and other aspects of the embodiments of the invention are discussed below with reference to FIGS. 1-25. However, those skilled in the art will readily appreciate that the detailed description given herein with respect to these figures is for explanatory purposes as the invention extends beyond these limited embodiments.

FIG. 1 is a block diagram of an electronic device or system 50, in accordance with one embodiment of the present invention. The electronic device 50 may correspond to a computer, such as a desktops, laptops, tablets or handheld computers. The electronic device may also correspond to other handheld computing devices, such as cell phones, PDA, media players, media storage device, camera, remote control, and/or the like. The electronic device may also be a multifunctional device that combines two or more of these device functionalities into a single device. Examples of multifunctional devices can be found in U.S. Provisional Patent Application No. 60/658,777 filed Mar. 4, 2005 and entitled "MULTI-FUNCTIONAL HAND-HELD DEVICE", which is herein incorporated by reference.

The exemplary electronic device 50 includes a processor 56 configured to execute instructions and to carry out operations associated with the electronic device 50. For example, using instructions retrieved for example from memory, the processor 56 may control the reception and manipulation of input and output data between components of the electronic device. The processor 56 can be implemented on a single-chip, multiple chips or multiple electrical components. For example, various architectures can be used for the processor 56, including dedicated or embedded processor, single purpose processor, controller, ASIC, and so forth. By way of example, the processor may include microprocessors, DSP, A/D converters, D/A converters, compression, decompression, etc.

In most cases, the processor 56 together with an operating system operates to execute computer code and produce and use data. Operating systems are generally well known and will not be described in greater detail. By way of example, the operating system may correspond to OSX, OS/2, DOS, Unix, Linux, Palm OS, and the like. The operating system can also be a special purpose operating system, such as may be used for limited purpose appliance-type computing devices. The operating system, other computer code and data may reside within a memory block 58 that is operatively coupled to the processor 56, Memory block 58 generally provides a place to store computer code and data that are used by the computer system 50. By way of example, the memory block 58 may include Read-Only Memory (ROM), Random-Access Memory (RAM), flash memory, hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The electronic device 50 also includes a display device 68 that is operatively coupled to the processor 56. The display device 68 may be a liquid crystal display (LCD). Alternatively, the display device 68 may be a monitor such as a monochrome display, color graphics adapter (CGA) display, enhanced graphics adapter (EGA) display, variable-graphics-array (VGA) display, super VGA display, cathode ray tube (CET), and the like. The display device may also correspond to a plasma display, a display implemented with electronic inks, or an organic light emitting diode (OLED) display. The display device 68 may be integrated with the electronic device 50 or it may be separate components (e.g., peripheral devices). In some cases, the display device 68 may be connected to the electronic device 50 through wired connections (e.g., wires/cables/ports). In other cases, the display device 68 may be connected to the electronic device 50 through wireless connections. By way of example, the data link may correspond to PS/2, USB, IR, RF, Bluetooth or the like (among others).

The display device 68 is generally configured to display a graphical user interface (GUT) 69 that provides an easy to use interface between a user of the computer system and the operating system or application running thereon. Generally speaking, the GUI 69 represents programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The electronic device 50 also includes an input arrangement 70 that is operatively coupled to the processor 56. The input arrangement 70 is configured to transfer data from the outside world into the electronic device 50. The input arrangement 70 may for example be used to perform tracking and to make selections with respect to the GUI 69 on the display 68. The input arrangement 70 may also be used to issue commands in the electronic device 50. The input arrangement 70 may be integrated with the electronic device 50 or they may be separate components (e.g., peripheral devices). In some cases, the input arrangement 70 may be connected to the electronic device 50 through wired connections (e.g., wires/cables/ports). In other cases, the input arrangement 70 may be connected to the electronic device 50 through wireless connections. By way of example, the data link may correspond to PS/2, USB, IR, RF, Bluetooth or the like (among others).

In accordance with one embodiment, the input arrangement 70 includes at least a MT data fusion inputting system. Multi-touch Data Fusion is the concept of uniting, merging or blending MT sensing with other sensing modalities to create a new approach to inputting. It is generally accomplished in a synergistic manner (cooperative action of two or more actions). MT data fusion may be is defined as the combination of data from one or more independent sensing or input modalities with MT data from a MT device in order to improve the operation and use of an electronic device. As shown, the MT data fusion inputting system includes a MT device 72 and one or more MT data fusion devices 74.

The MT device 72 is configured to receive input from a user's touch and to send this information to the processor 56. By way of example, the MT device 72 may correspond to a touchpad, a touch screen, a touch sensitive housing or other related touch device. As mentioned, MT sensing is capable of distinguishing multiple touches that occur at the same time. Generally, the MT device 72 recognizes touches, as well as the position and magnitude of touches on a multi touch sensitive surface. The MT device 72 reports the touches to the processor 56 and the processor 56 interprets the touches in accordance with its programming. For example, the processor 56 may initiate a task in accordance with a particular touch or touch event. The processor may include a set of instructions that recognizes the occurrence of chords and movements thereof and informs one or more software agents of what action(s) to take in response to the chords and movement. A dedicated processor can be used to process touches locally and reduce demand for the main processor of the electronic device.

The MT data fusion devices 74 are configured to provide secondary information or data that can be fused with the MT data in order to significantly enhance and improve input operations for the user. The secondary may be provided by a wide variety of sources. By way of example, the sources may include a variety of sensors including but not limited to biometric sensors, audio sensors, optical sensors, sonar sensors, vibration sensors, motion sensors, location sensors, light sensors, image sensors, acoustic sensors, electric field sensors, shock sensors, environmental sensors, orientation sensors, pressure sensors, force sensors, temperature sensors, and/or the like.

The sensors may be located at a wide variety of locations relative to the MT surface. In some cases located above, in other cases located below. The sensors may even be level with the MT surface. The sensors may be located around the periphery of the MT surface or they may be found within the plane of the MT surface. In one example, pixilated or localized sensors are embedded in or layered with the MT surface. For example, temperature sensitive thin film resistors may be spread throughout the panel I order to provide temperature data at localized areas of the MT surface.

In specific examples, the one or more MT data fusion devices may be selected from voice recognition, image recognition, gaze recognition, mood recognition, biometric, environmental, device dynamics and/or the like.

The fusing may be accomplished with the processor or alternatively a separate dedicated processor that is part of the MT data fusion inputting system. When and where the data is fused can be widely varied. Integration may for example come early, late or at the same time.

Generally, the MT data fusion device performs some operation such as sensing and may include processing components for processing any data. The MT data fusion device reports secondary data to the processor 56 and the processor 56 interprets the secondary data in context of the MT data in accordance with its programming. In one embodiment, the secondary data may be used to help interpret MT data. Additionally or alternatively, the secondary data may be used to supplement the MT data in order to streamline input operations. For example, the secondary data may enable multitasking, chaining and continuous stream inputting. Additionally or alternatively, the secondary data may be used to create a new input altogether. That is, MT data+secondary data=command.

The processor may have a translator that receives both sensing data and refers to a database to determine the correct course of action. The language map may include a set of instructions that recognizes both an arrangement of contacts on MT surface and other sensing data, recognizes the occurrence of the events and informs one or more software agents of the events and/or what action to take in response to the events.

In one embodiment, the secondary data and MT data is fused temporally. Generally, temporal fusion signifies an apparent coming together of several events in time (multiple sets of data) within a single individual context (computer application, mode or platform). More specifically, in temporal fusion, the data from multiple sources (MT+other sensing modality) is interpreted in a time coherent manner. The information flowing from the various sources are combined or fused such that events in each data stream are time aligned with each other. As such, the multiple data streams can be properly understood in conjunction with the other.

Figure 2:
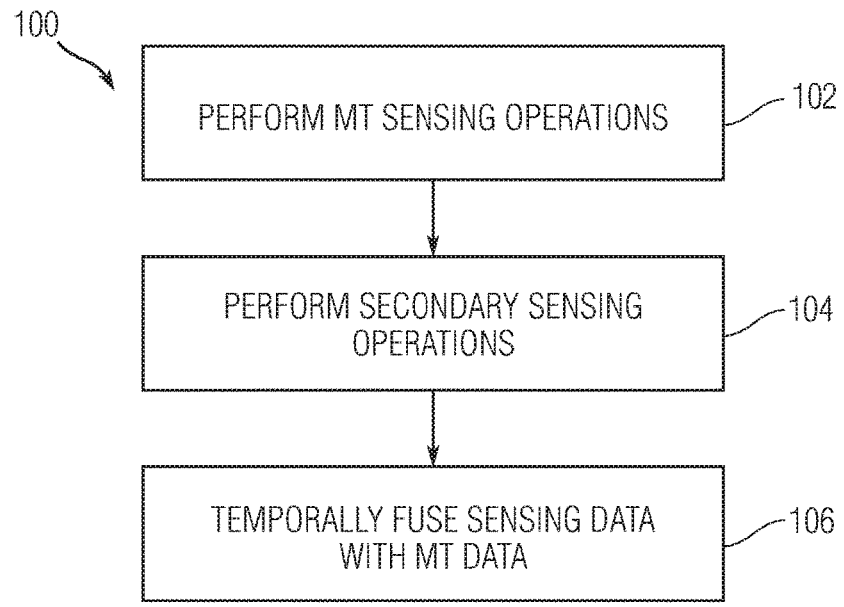
FIG. 2 is a MT data fusion method including MT sensing and secondary sensing in accordance with one embodiment of the present invention.

FIG. 2 is a Multi-touch (MT) data fusion method 100, in accordance with one embodiment of the present invention. The method 100 include block 102 where MT sensing operations are performed. The method 100 also includes block 104 where secondary sensing operations are performed. The method 100 also includes block 106 where the sensing data is temporally fused with the MT data.

Figure 3:
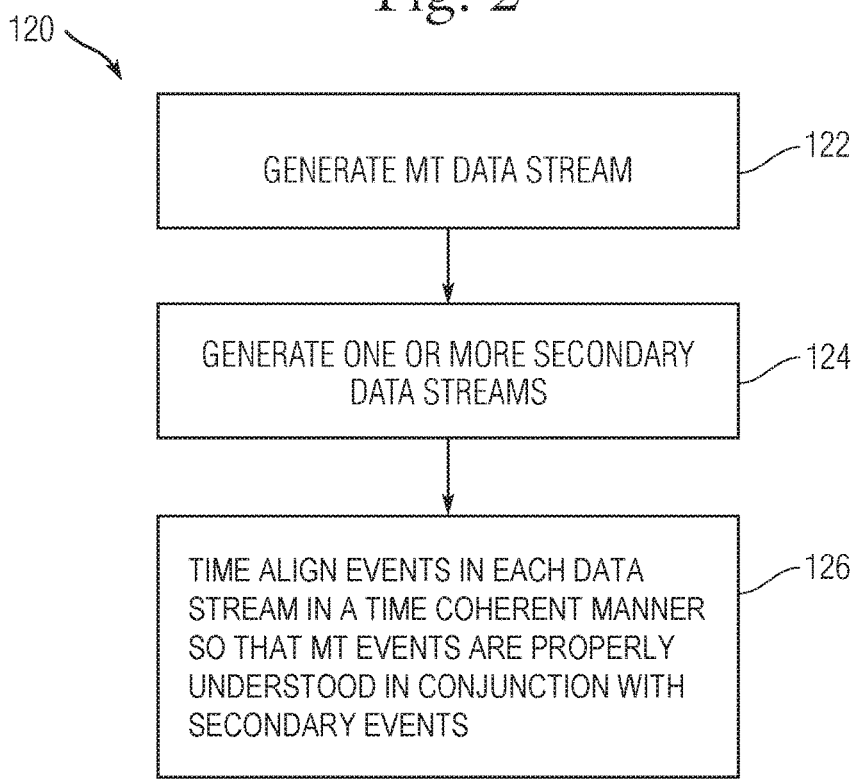
FIG. 3 is a MT data fusion method including the generation of MT and secondary data streams in accordance with one embodiment of the present invention.

FIG. 3 is a Multi-touch (MT) data fusion method 120, in accordance with one embodiment of the present invention. The method 120 include block 122 where an MT data stream is generated. The method 120 also includes block 124 where one or more secondary data streams are generated. The secondary data stream is included to supplement or interpret the MT data. The method 120 also includes block 126 where events in each data stream are time aligned so that MT events are properly understood in conjunction with the secondary events.

Figure 4:
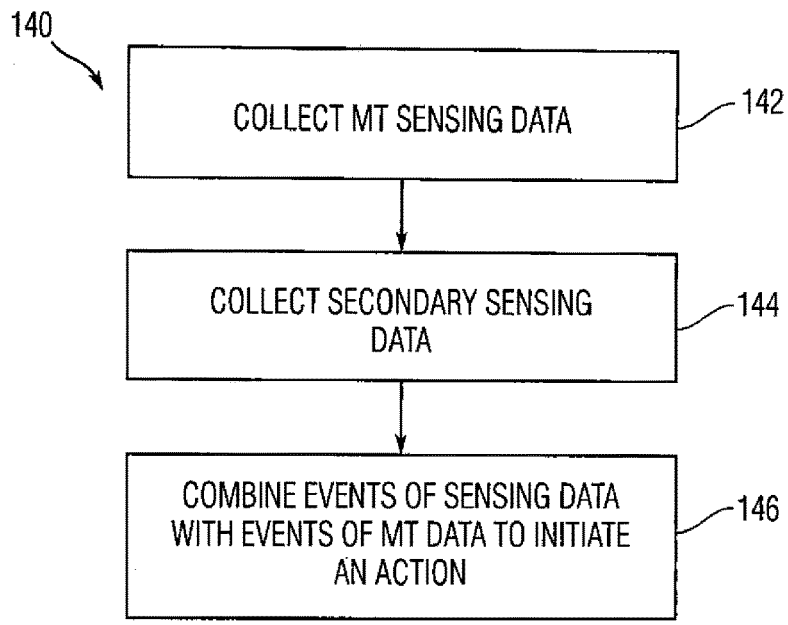
FIG. 4 is a method of inputting including the collection and combining of MT and secondary sensing data in a time-coherent manner in accordance with one embodiment of the present invention.

FIG. 4 is a method of inputting 140, in accordance with one embodiment of the present invention. The method 140 includes block 142 where MT sensing data is collected. The method 140 also includes block 144 where secondary sensing data is collected. The method 140 additionally includes block 146 where in a time coherent manner events of sensing data are combined with events of MT data to initiate an action.

Figure 5:
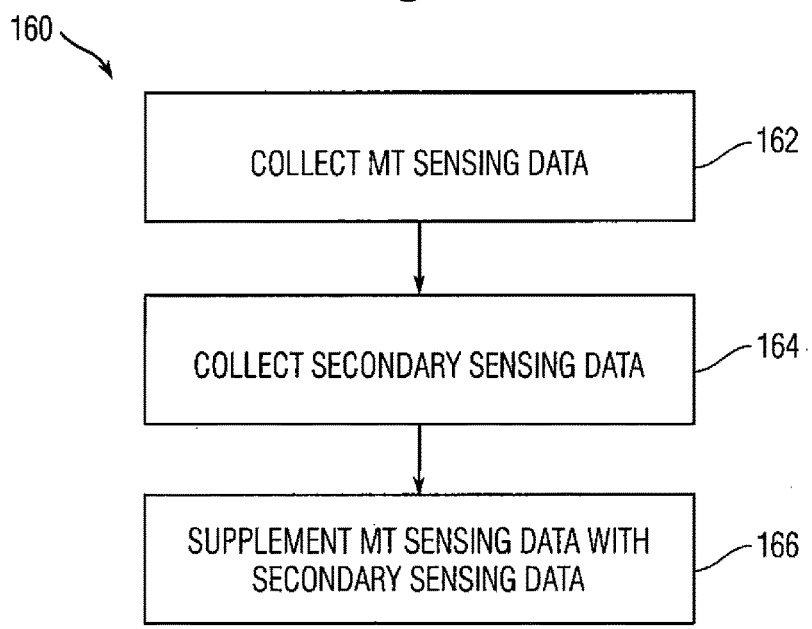
FIG. 5 is a method of inputting wherein the secondary sensing data is utilized to supplement the MT data in a time-coherent manner accordance with one embodiment of the present invention.

FIG. 5 is a method of inputting 160, in accordance with one embodiment of the present invention. The method 160 includes block 162 where MT sensing data is collected. The method 160 also includes block 164 where secondary sensing data is collected. The method 160 additionally includes block 166 where in a time coherent manner the sensing data is utilized to supplement the MT data (simultaneous or sequential) such that an inputting session is fluid, seamless and efficient.

Figure 6:
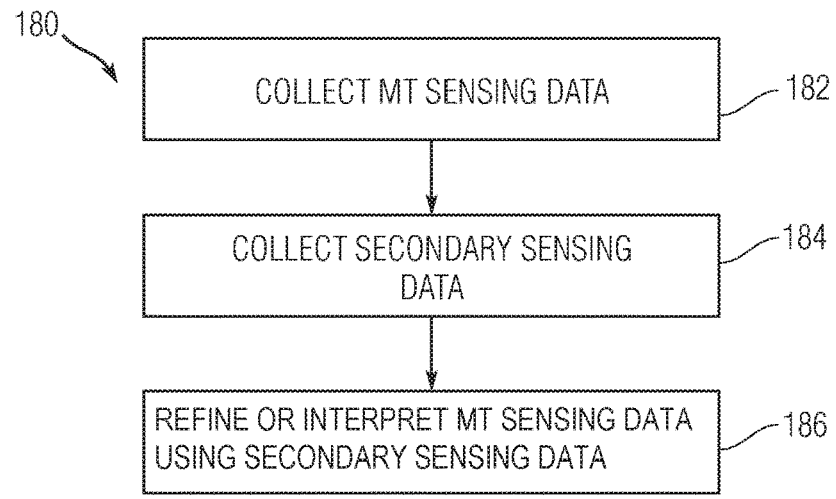
FIG. 6 is a method of inputting wherein the secondary sensing data is utilized to interpret the MT data in a time-coherent manner in accordance with one embodiment of the present invention.

FIG. 6 is a method of inputting 180, in accordance with one embodiment of the present invention. The method 180 includes block 182 where MT sensing data is collected. The method 180 also includes block 184 where secondary sensing data is collected. Although shown as consecutive blocks, it should be noted that the blocks are typically performed in the same time domain so events in one correspond to events in the other. The method 180 additionally includes block 186 where in a time coherent manner the sensing data is utilized to interpret the MT data so that MT operations can be expanded and improved. By way of example, the secondary data may be used to make assumptions about the MT data, to anticipate MT data, to make provisions for MT data, to correct MT data, to filter MT data, etc. In one embodiment, the secondary data is used to better determine or define characteristics, attributes or behaviors associated with individual contacts, specific arrangement of contacts, motions of one or more contacts, motions of contacts relative to each other, etc. By way of example, the secondary data may provide additional contacts information regarding Z magnitude or pressure, x coordinate, y coordinate, ID, angle, area. The secondary data may also provide information regarding chord grouping, distance between contacts, centroid of contact arrangement, pressure of contact arrangement, rotation or translation of contacts relative to one another or as a group of contacts, speed of individual contacts, speed of arrangement of contacts, relative speed between contacts, etc.

Figure 7:
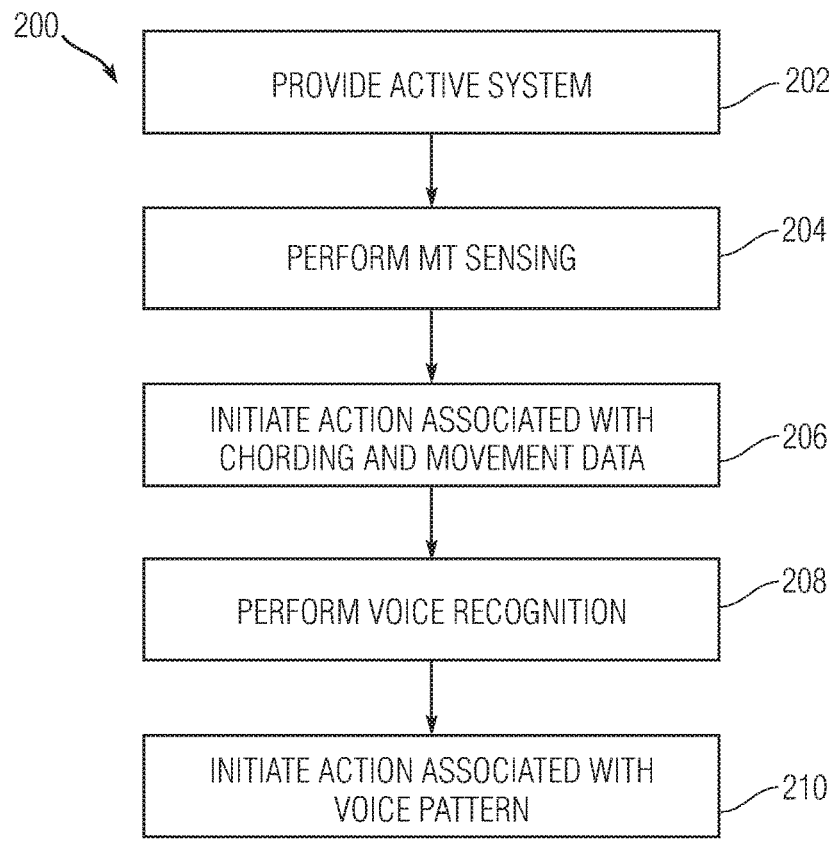
FIG. 7 is a method of inputting including voice recognition that triggers actions associated with chording and movement data in accordance with one embodiment of the present invention.

FIG. 7 is a method of inputting 200, in accordance with one embodiment of the present invention. The method 200 includes block 202 where an application, system or platform is active. The method also includes block 204 where MT sensing is performed, and chords and movement data are recognized. The method 200 also include block 206 where actions associated with the chording and movement data are initiated. The method 200 also includes block 208 where voice recognition is performed, and voice patterns are recognized. The method 200 also includes block 210 where actions associated with the voice patterns are initiated.

Figure 8:
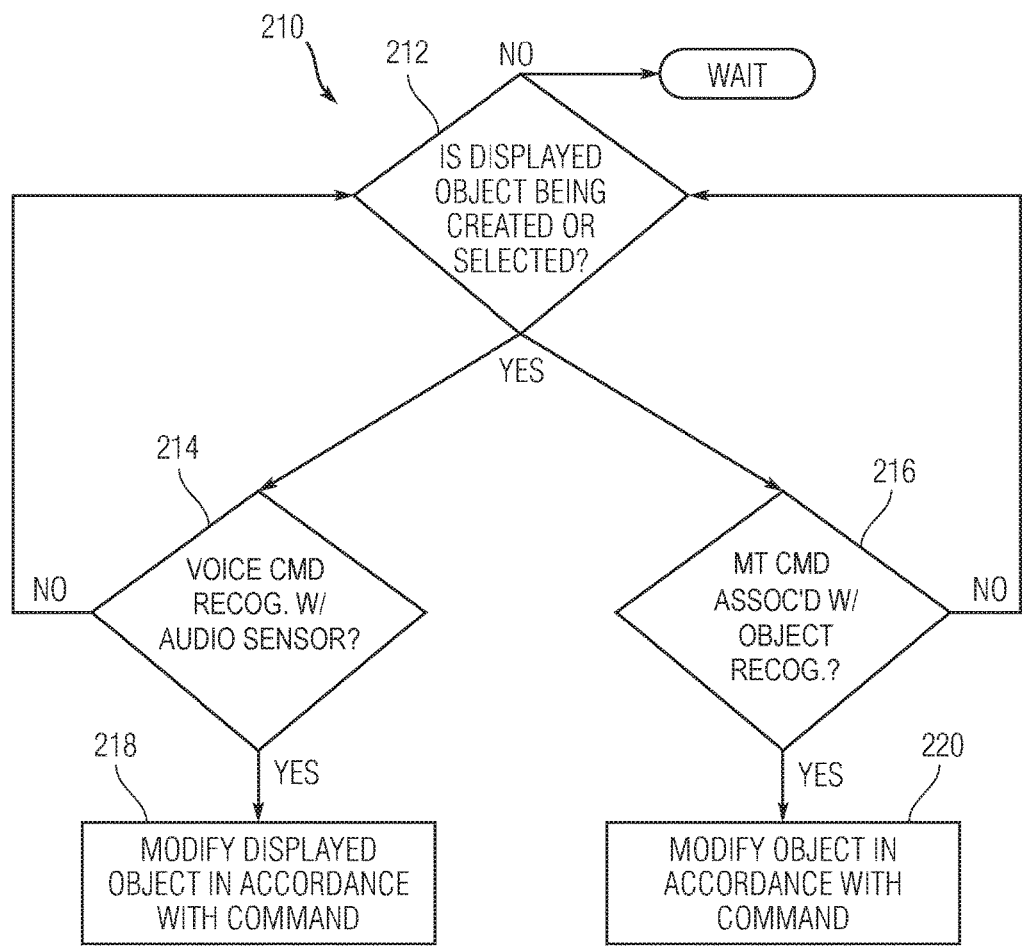
FIG. 8 is a method of inputting wherein a voice modify command triggers actions on an object in accordance with one embodiment of the present invention.

FIG. 8 is a method of inputting 210, in accordance with one embodiment of the present invention. The method begins at block 212 where a displayed object is selected or created during MT input. If no object is selected or created, then the method 210 waits. If an object is selected or created, the method 210 proceeds down two simultaneously occurring blocks 214 and 216. In block 214, a determination is made as to whether or not a voice modify command is recognized while object is selected or created. If so, the method 210 continues to block 218 where the selected or created object is modified in accordance with command. If not, the method 210 flows back to block 212. In block 216, a determination is made as to whether or not a MT command is recognized while object is selected or created. If so, the method 210 continues to block 220 where the selected or created object is modified in accordance with command. If not, the method flows back to block 212.

Figure 9A:
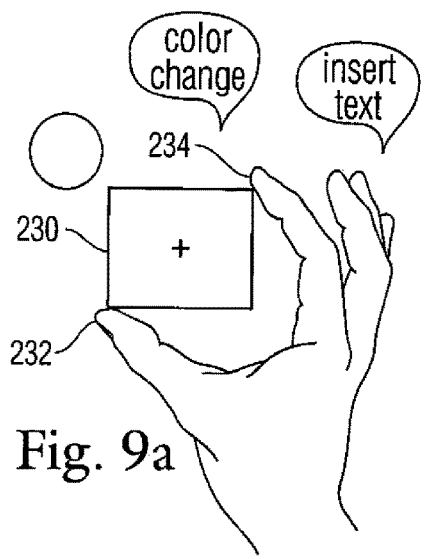
FIGS. 9A-9E are diagrammatic illustrations of fusing voice data with MT data according to one embodiment of the invention.
Figure 9B:
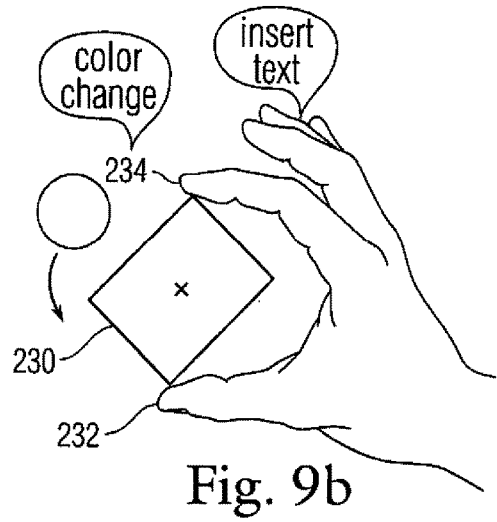
Figure 9C:
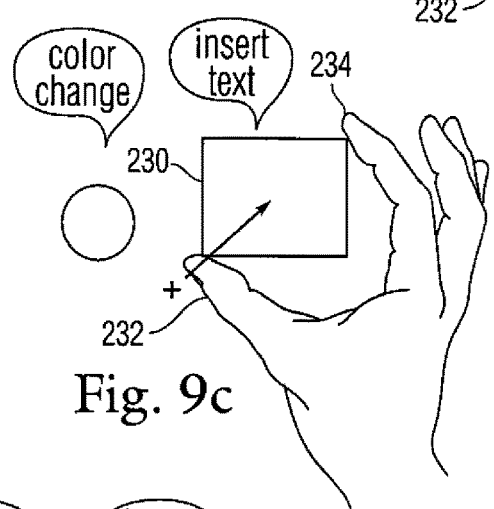
Figure 9D:
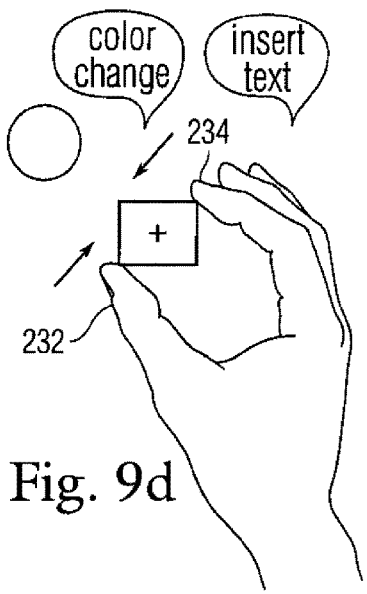
Figure 9E:
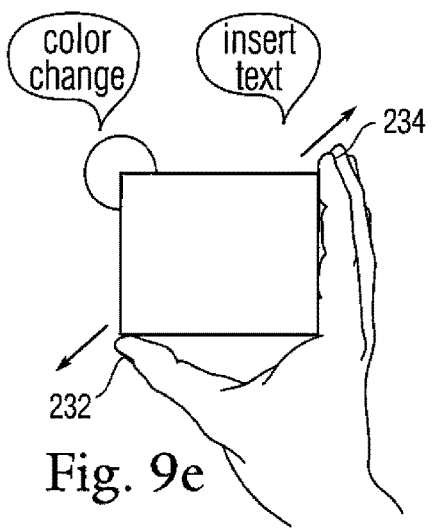

FIGS. 9A-9E are diagrammatic illustrations of fusing voice data with MT data according to embodiments of the invention. As shown in FIG. 9A, a user grabs a displayed object 230 with multiple fingers 232 and 234. This essentially selects the displayed object 230 for adjustments or changes. As shown in FIG. 9B, the user rotates fingers 232 and 234 in order to rotate the displayed object 230 (e.g., the object rotates simultaneously with the rotation of the fingers). As shown in FIG. 9C, the user slides their fingers 232 and 234 together across the displayed surface in order to move the displayed object 230 from one location to a new location in the viewing area or on the displayed page. As shown in FIGS. 9D and 9E, the user resizes the displayed object by pinching their fingers 232 and 234 or spreading their fingers 232 and 234 apart.

At any time during these operations, the user can further modify the displayed object 230 with voice commands. For example, the user may simply call out a color in order to change the color of the object. Alternatively, the user may state "insert text" and then speech thereafter is inputted within the displayed object 230. As should be appreciated, voice commands enable the user to continue MT inputting without interruption. Additionally or alternatively, the user may use gaze recognition to further enhance the inputting operation. For example, the user may gaze at another object and subsequently look at a new location to move a second object 231 to that location. Again this can be performed while the user is performing MT inputting on the first object 230. As a result, inputting can be more efficient.

Figure 10:
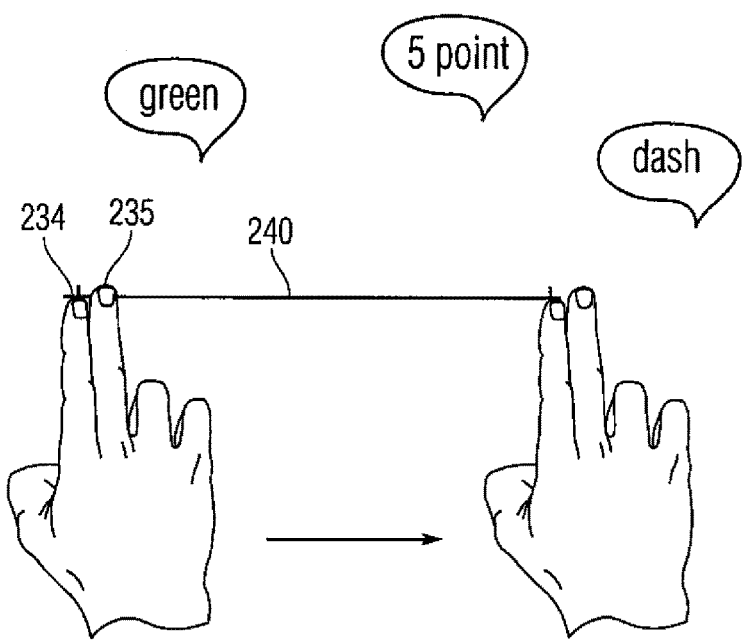
FIG. 10 is illustrates the fusion of voice recognition and MT operations according to embodiments of the invention.

FIG. 10 is another diagram showing the fusion of voice recognition and MT operations according to embodiments of the invention. In this embodiment, the user is creating a line segment 240 by dragging two fingers 234 and 235 across the screen. At any point during this creating, the user can call out voice commands to modify the line segment 240. For example, the may call out "green" to change the line color of the line segment 240 to green. They may also call out "5 point" to change the thickness of the line segment 240. The user may also call out "dash" to change the line segment 240 to a dashed line. In all of these examples, the user can continue with MT inputting thereby making inputting more efficient.

It should be noted that embodiments of the invention are not limited to color change and insert text commands, and that other commands may be used (e.g., open, close, etc.).

Figure 11:
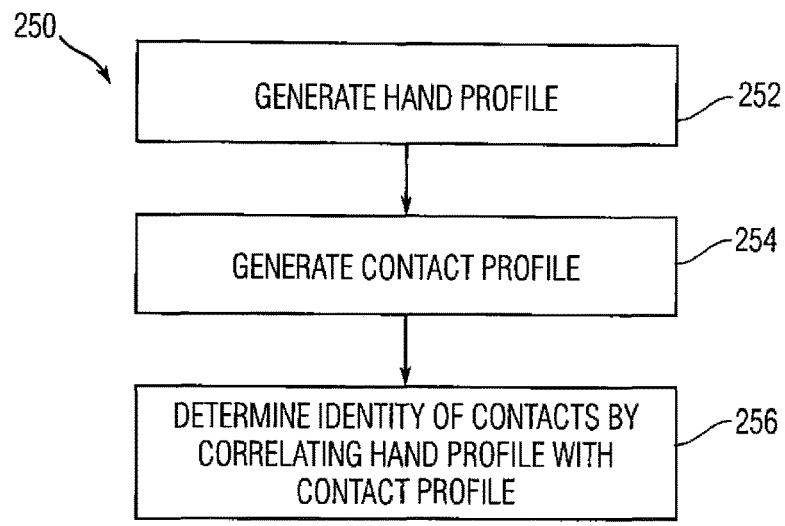
FIG. 11 is a method for unambiguous finger identification in accordance with one embodiment of the present invention.

FIG. 11 is a method 250 for unambiguous finger identification, in accordance with one embodiment of the present invention. The method 250 includes block 252 where a hand profile is generated via a first sensing mechanism during inputting task. The hand profile indicating specific fingers of the hand and their location within a plane. The location may be specific to a single axis or to multiple axis as for example the X and Y axis of the plane. The hand profile may be created from below, level with or above the plane. The hand profile may for example be generated via an imaging device such as an image sensor. The method 250 also includes block 254 where a contact profile is generated via a second sensing mechanism during the inputting task. The contact profile indicating one or more contact regions caused by fingers touching a surface and their location within the plane. The location may be specific to a single axis or to multiple axis as for example the X and Y axis of the plane. If a single axis is used, then it at least corresponds to the axis used for the hand profile. In most cases, the axis that transverses or is substantially perpendicular to the fingers is used. The contact profile may be generated using a MT device that senses touches at a surface of the plane. The method 250 further includes block 256 where the identity of the contacts are determined by correlating or matching the hand profile with the contact profile. This may be accomplished by comparing the location of the fingers with the location of the contacts.

For example, the hand profile may indicate fingers at specific X locations, and the contact profile may indicate contacts at specific X locations. The contact location that best fits the finger location may be identified as that finger. Essentially, there are two data sets, and you look at where they coincide. Various methods may be implemented including match filtering and spatial correlation.

Figure 12:
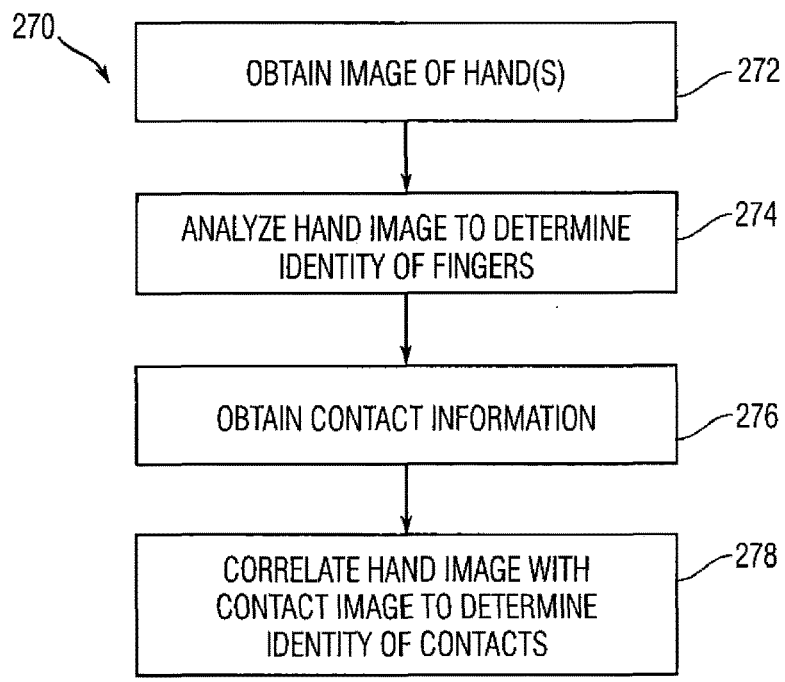
FIG. 12 is another method for unambiguous finger identification, in accordance with one embodiment of the present invention.

FIG. 12 is a method 270 for unambiguous finger identification, in accordance with one embodiment of the present invention. The method 270 includes block 272 where an image of the hand including fingers located above MT surface is obtained. The method 270 also includes block 274 where the hand image is analyzed to determine identity of fingers. The method 270 also includes block 276 where image of fingers in contact with MT surface are obtained. The method 270 additionally includes block 278 where the hand image and contact image are correlated to determine identity of contacts. Although the term "image" is used and shown it should be noted that the data may come in other forms (e.g., signals or other mathematical functions).

Figure 13:
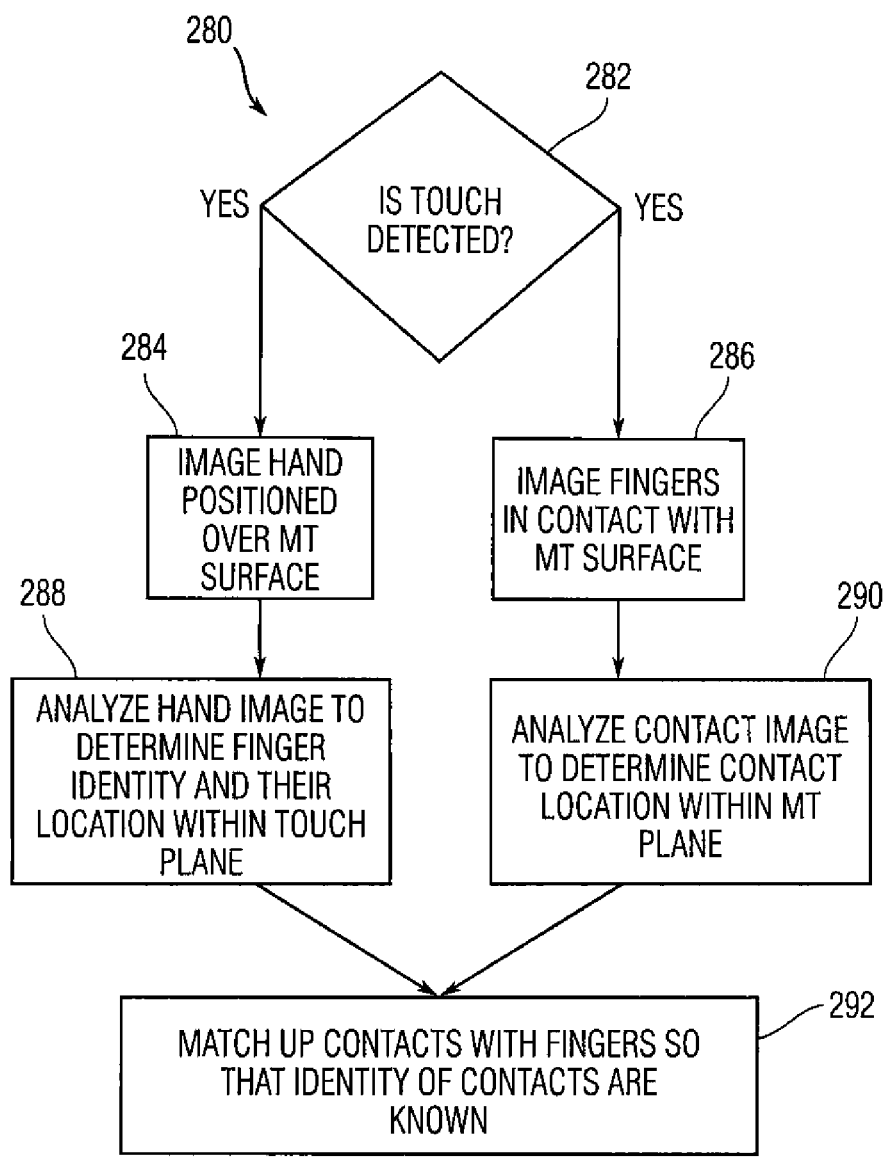
FIG. 13 is an inputting method including the matching of fingers to contacts in accordance with one embodiment of the present invention.

FIG. 13 is an inputting method 280, in accordance with one embodiment of the present invention. The inputting method 280 begins at block 282 where a determination is made as to whether or not a touch is detected. If a touch is detected, the method 280 proceeds to blocks 284 and 286. In block 284, the hand(s) positioned over the MT surface are imaged with an image sensor. The image sensor may be embedded in the MT surface, at the periphery of or around the edges of the MT surface, or at a location above the MT surface. In block 286, the fingers in contact with the MT surface are imaged. Following both blocks 284 and 286 are blocks 288 and 290. In block 288, the hand image is analyzed to determine finger identity and their location within the MT surface plane. In block 290, the contact image is analyzed to determine contact location within the MT surface plane. Thereafter, in block 292, the contacts are matched up with the fingers so that the identities of the contacts are known. Although the term "image" is used and shown it should be noted that the data may come in other forms (e.g., signals or other mathematical functions).

Figure 14A:
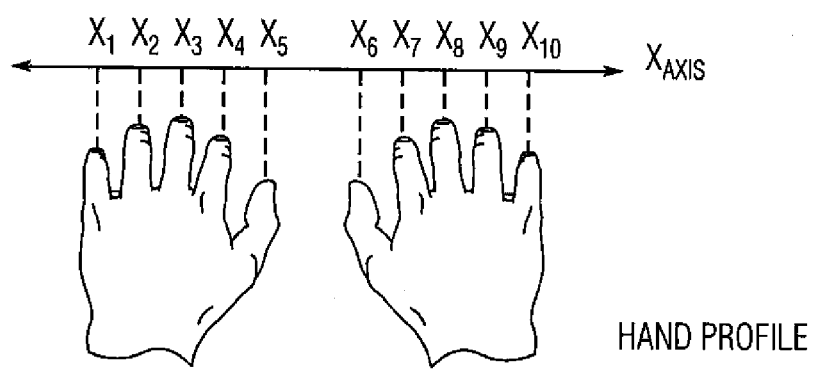
FIG. 14A is an illustration of an exemplary image of a pair of hands that are positioned over a MT surface.
Figure 14B:
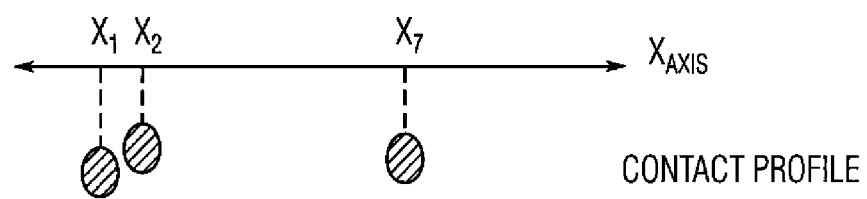
FIG. 14B is an illustration of an exemplary image of an arrangement of contacts at the MT surface.

FIG. 14A is an illustration of an exemplary image 300 of a pair of hands that are positioned over a MT surface, and FIG. 14B is an illustration of an exemplary image 302 of an arrangement of contacts at the MT surface. As shown in 14A, the image 300 of the hands is processed to identify the fingers and determine the X location of each of the fingers. The image may provide a modulated pattern of bumps in the X coordinate. The image system may detect the interstitial spaces between bumps to determine which finger is creating the contact. The image system may examine the hue of the fingers, examine contrast between fingers (bright/light spots), examine size of each finger, or look for finger nails, and/or the like. The thumbnails may be easily identifiable relative to the other fingers since the thumb is typically pronated relative to the other fingers (thus they have a different shape). As shown in 14B, the image 302 of the contacts is processed to determine the X location of each of the contacts. Once the X locations are found, they are compared to the X locations of the fingers to determine the identity of the contacts. It should be noted that this will typically not be an exact fit and thus a best fit algorithm may be applied to help determine which contacts are the likely matches for the fingers. In the illustrated example, a first contact is located at X1, which corresponds to the left pinky at X1, the second contact is located at X2, which corresponds to the left ring finger, and a third contact is located at X7, which corresponds to the right index finger. Although the term "imaged" is used and shown it should be noted that the data may come in other forms (e.g., signals or other mathematical functions).

The hand profiles may be used to create dynamic tractor templates. In one case, the minimum sum of distance squared may be use to identify which contact goes with which finger.

Figure 15A:
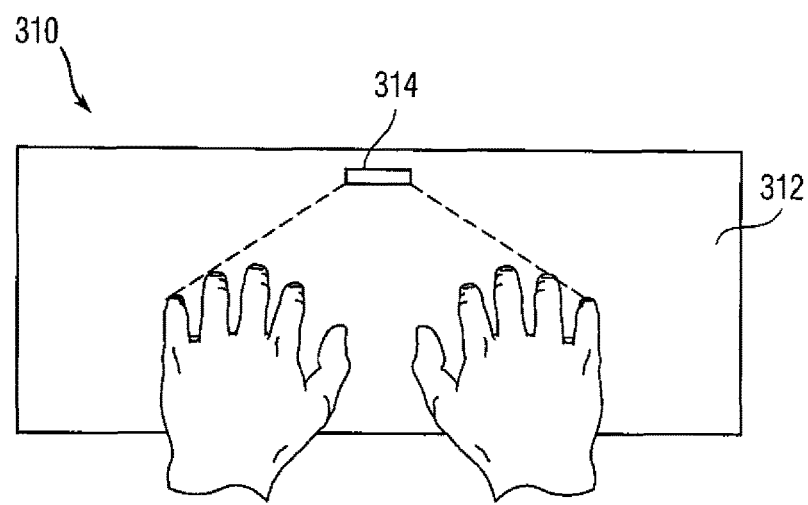
FIG. 15A and 15B are diagrams of an electronic device including a MT surface and an imaging device in accordance with one embodiment of the present invention.
Figure 15B:
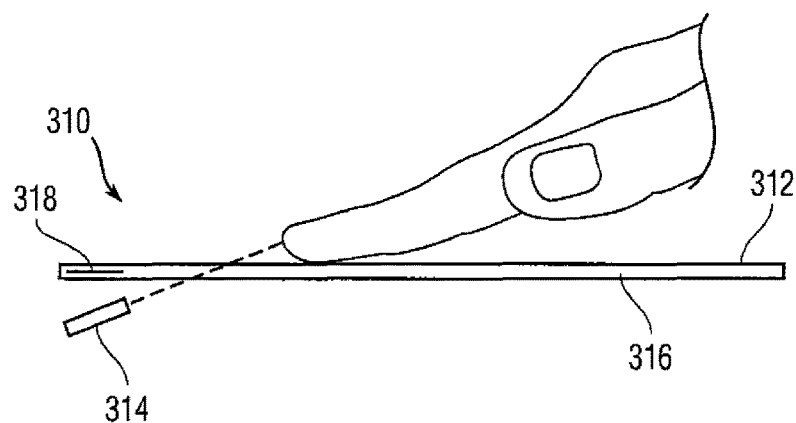

FIG. 15A and 15B are diagrams of an electronic device 310, in accordance with one embodiment of the present invention. The electronic device 310 includes a MT surface 312 for obtaining contact information associated with fingers in contact with the MT surface 312, and an imaging device 314 for obtaining images of hand(s) hovering over the MT surface 312. As shown, the image sensor 314 is positioned above the hands relative to the plane and at a top edge of the MT surface 312. It is configured to create an image of the hand(s) relative to the X axis. Furthermore, the image sensor 314 is embedded underneath or recessed behind the top surface of the electronic device 310. It is configured to image the hand through an optically member 316 disposed at the top surface of the electronic device 310. In some cases, the optical member 316 may be configured to hide the image sensor 314 from view as for example behind a bezel or opaque portion. In one embodiment, the image sensor 314 is angled relative to the top surface (as shown) so that it can image the hands but be hidden underneath a bezel portion 318. For example, it may be angled 30 degrees relative to top surface.

Figure 16:
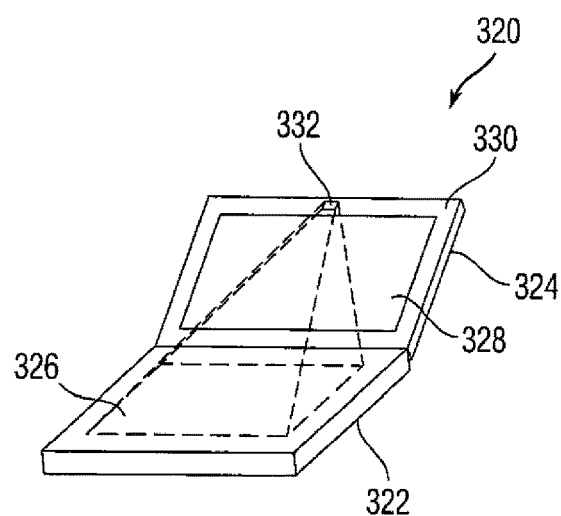
FIG. 16 is a diagram of an electronic device including a MT surface and an image sensor in accordance with another embodiment of the present invention.

FIG. 16 is a diagram of an electronic device 320, in accordance with another embodiment of the present invention. In this embodiment, the electronic device 320 is a laptop computer having a base 322 and a pivotal lid 324. The base 322 includes a MT surface 326 while the lid 324 includes a display 328 that is surrounded by a bezel 330. Located within the bezel 330 is an image sensor 332 that is located high above the MT surface 326 and that is capable of imaging the MT surface 326. As such, hand profiles may be collected. Because of the angle of the lid 324 relative to the base 322 changes during use, the image sensor 332 may include a servo for tilting the image sensor 332 in the direction of the MT surface 326. In one case, a sensor that monitors the angle of the lid relative to the MT surface may also be provided. The servo can be correctly positioned for imaging the surface by referring to the measured angle. Alternatively, a tiltable mirror may be used instead of tilting the image sensor. The image sensor may have other functions including web cam. By way of example, the image sensor may be an iSight camera that is part of the Macbooks manufactured by Apple Computer of Cupertino, Calif.

Additional Details for pivoting an image sensor to a lid may be found in patent application Ser. No. 10/800,166, filed Mar. 12, 2004, titled CAMERA LATCH, which is herein incorporated by reference.

Figure 17:
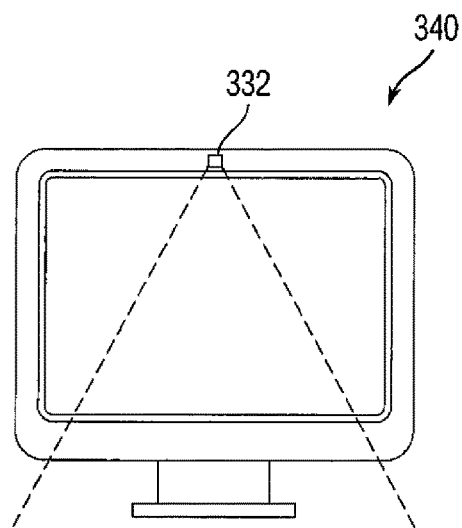
FIG. 17 illustrates an image sensor located in a display or all in one computer 340 in accordance with another embodiment of the present invention.

As shown in FIG. 17, the image sensor 332 may also be located in a display or all in one computer 340 such as the iMac manufactured by Apple Computer of Cupertino, Calif. In one embodiment, the image sensor may be configured to image the area below and in front of the display to find the MT surface, and subsequently align itself as needed.

With regards to the embodiments mentioned above, although image sensor such as CCD or CMOS sensor is described, it should be noted that other sensing modalities may be used to image the hand. For example, laser scanners or micro radar may also be used. Furthermore, in some cases the image sensor may be pixilated image surface which can be layered and possibly work through the MT surface.

Figure 18:
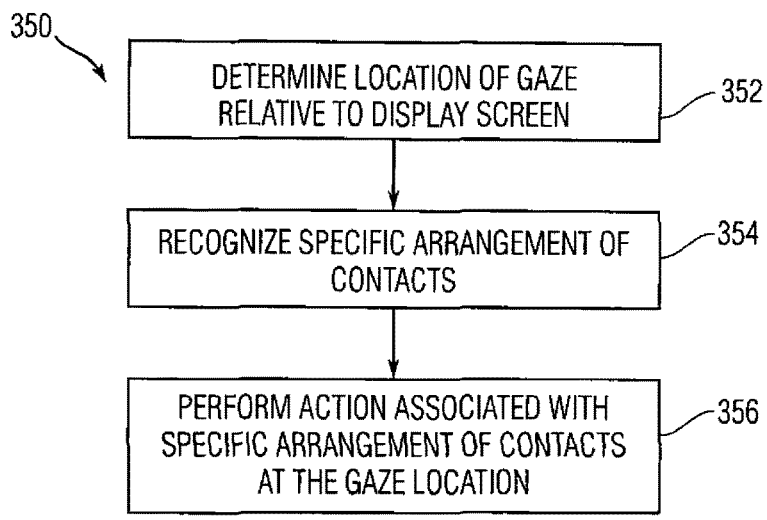
FIG. 18 is an inputting method including the fusion of a gaze vector with MT sensing in accordance with one embodiment of the present invention.

FIG. 18 is an inputting method 350, in accordance with one embodiment of the present invention. The inputting method 350 fuses gaze vector with MT sensing. The method 350 includes block 352 where the location of a gaze relative to a display screen is determined. The method 350 also includes block 354 where a specific arrangement of contacts and possibly motions thereof are recognized. The method 350 additionally includes block 356 where an action associated with the arrangement of contacts are performed at the gaze location.

Figure 19:
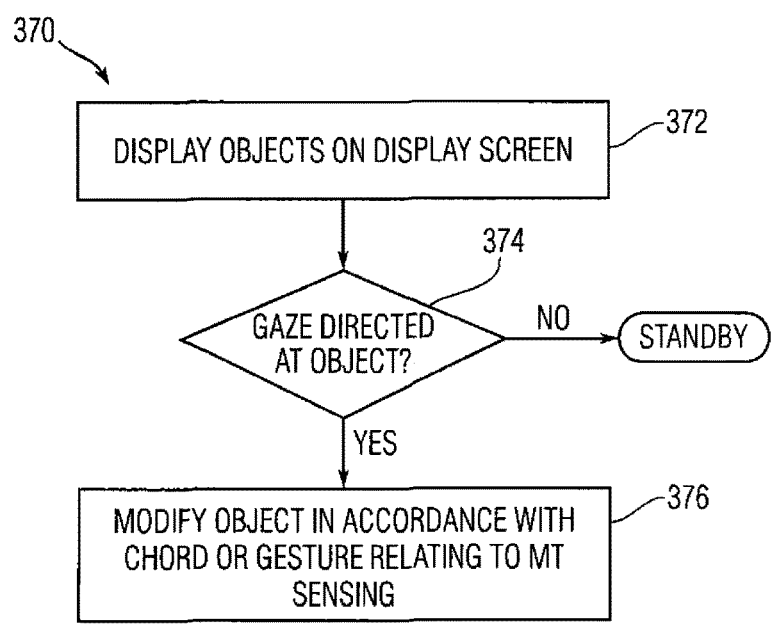
FIG. 19 is an inputting method including taking action on an object based on a gaze in accordance with one embodiment of the present invention.

FIG. 19 is an inputting method 370, in accordance with one embodiment of the present invention. The method 370 begins at block 372 where an object is displayed on a display screen. The method 370 proceeds to block 374 where a determination is made as to whether or not a gaze is directed at the object. If not, the method 370 is placed in standby. If so, the method 370 proceeds to block 376 where the object is modified in accordance with a chord or gesture associated with MT sensing.

Figure 20:
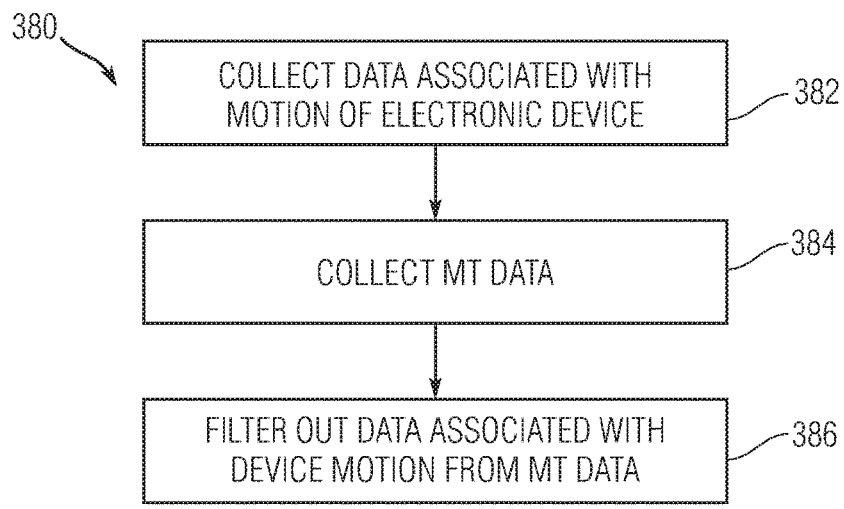
FIG. 20 is an inputting method including the filtering of MT data based on motion data in accordance with one embodiment of the present invention.

FIG. 20 is an inputting method 380, in accordance with one embodiment of the present invention. The method 380 includes block 382 where data associated with motion of electronic device is collected. The method 380 also includes block 384 where MT data is collected. The method 380 additionally includes block 386 where data associated with motion of device is filtered out from the MT data. This method may for example be used when the user is in motion (e.g., in a car, jogging, etc.). In these cases, the sensitivity of the MT panel may be decreased to avoid false triggering of panel areas.

Examples of motion detection and filtering of touch data may be found in U.S. patent applications Ser. No 10/997, 479, filed Nov. 24, 2004, titled "MUSIC SYNCHRONIZATION ARRANGEMENT", U.S. patent applications Ser. No. 10/722,948, filed Nov. 25, 2003, entitled "TOUCH PAD FOR HANDHELD DEVICE", both of which are herein incorporated by reference.

Figure 21:
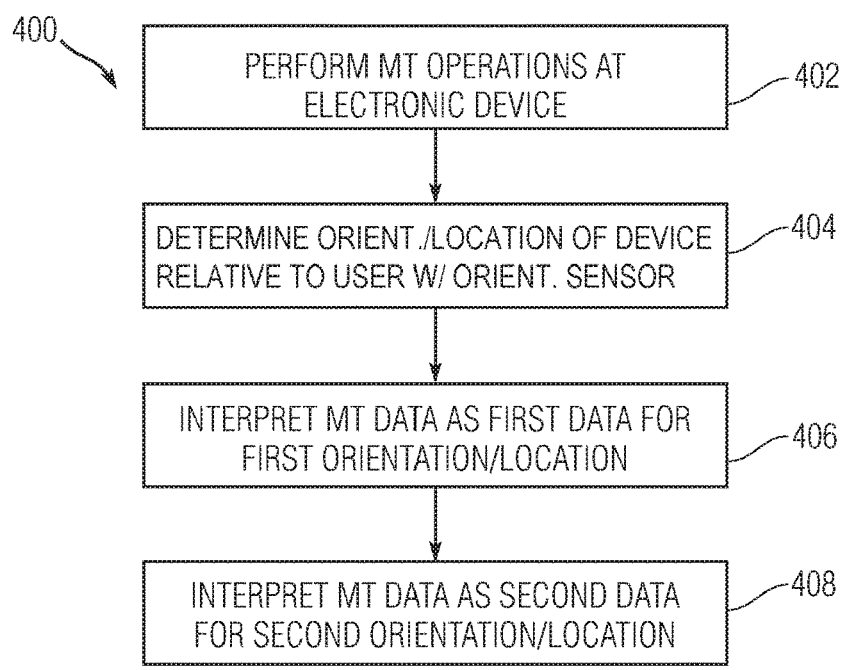
FIG. 21 is an operational method wherein MT data can be interpreted differently depending on orientation data in accordance with one embodiment of the present invention.

FIG. 21 is an operational method 400, in accordance with one embodiment of the present invention. The method 400 includes block 402 where MT operations are performed at an electronic device such as a handheld device. The method 400 also includes block 404 where orientation and/or location of device relative to a user is determined. The method 400 also includes block 406 where the MT data is interpreted as first data if device is in first orientation and/or location. The method 400 additionally includes block 408 where the MT data is interpreted as second data if device is in second orientation and/or location. By way of example, if the device is located away from the user as for example when the user holds the device in front of them, the MT sensing may be interpreted as chording and movement data, and if the device is located close to the user the MT sensing may be interpreted as imaging data. The image data may be used to sense environment as well as objects. For example, it may be used to sense that the device is close to the face. The imaging data may be used to initiate actions. For example, if the side of the face is detected then cellular actions may be initiated.

Figure 22:
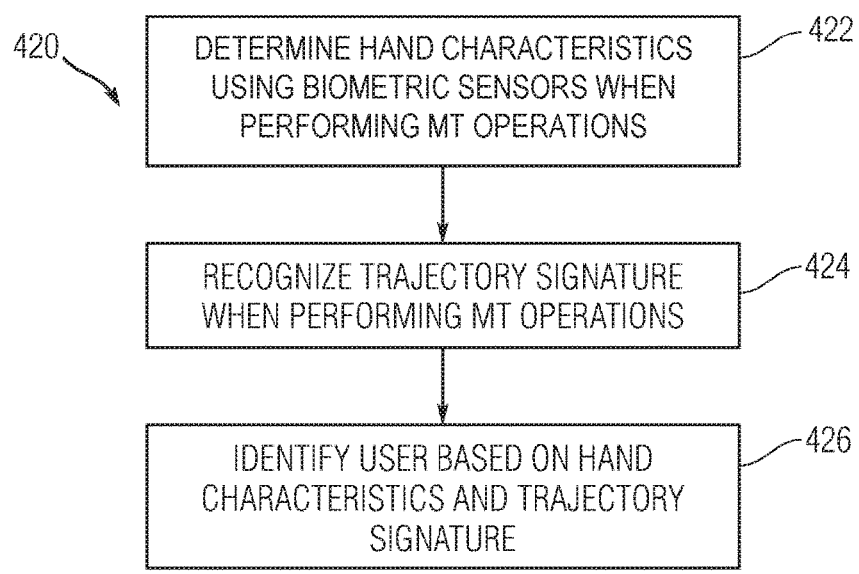
FIG. 22 is an inputting method including biometric sensing in accordance with one embodiment of the present invention.

FIG. 22 is an inputting method 420, in accordance with one embodiment of the present invention. The method 420 includes block 422 where hand characteristics are determined using biometric sensor(s). The method 420 also includes block 424 where a trajectory signature is recognized when performing MT operations. The method 420 additionally includes block 426 where the user is identified based on hand characteristics and trajectory signature.

Figure 23:
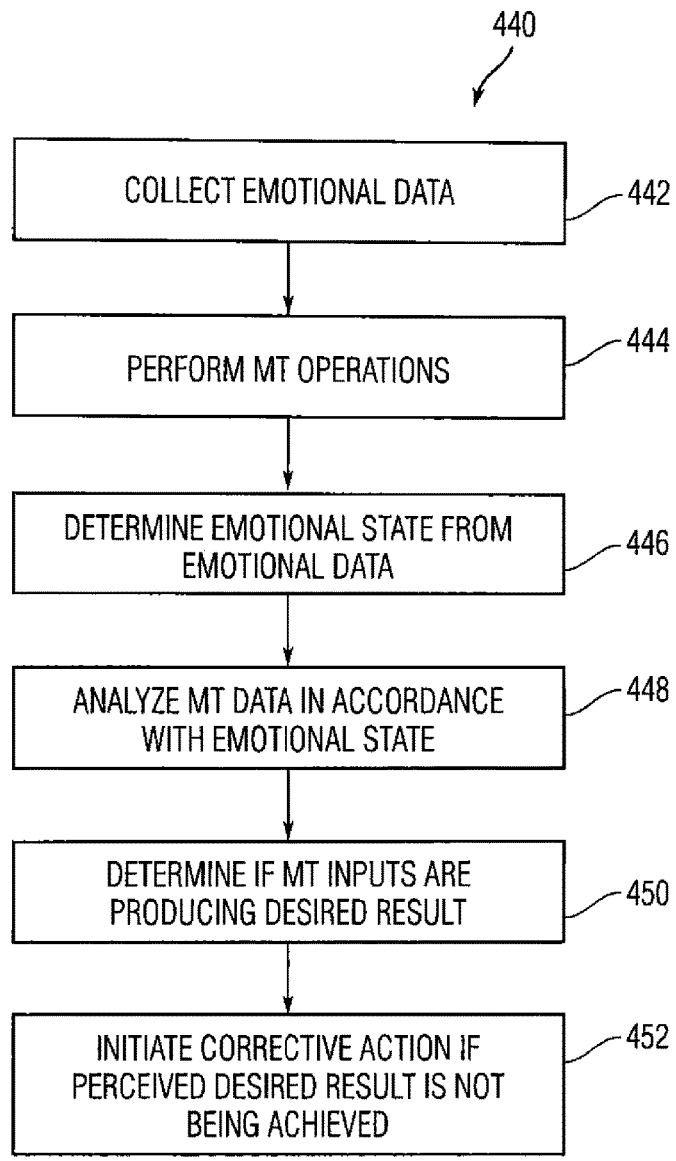
FIG. 23 is an operational method including collecting emotional data and taking actions based on the emotional data in accordance with one embodiment of the present invention.

FIG. 23 is an operational method 440, in accordance with one embodiment of the present invention. The method 440 includes block 442 where emotional data is collected by monitoring facial expressions. The method 440 also includes block 444 where MT operations are performed. The method 440 further includes block 446 where the emotional state of the user is determined from the emotional data. The method 440 additionally includes block 448 where MT data is analyzed in accordance with emotional state. The method 440 also includes block 450 where it is determined if MT inputs are producing desired result. For example, if the emotional state indicates frustration during inputting with MT device, then the frustration may be due to undesirable results from inputting. The method 440 additionally includes block 452 where a corrective action is initiated if the perceived desired result is not being achieved. For example, if the analyzing determine that the frustration is due to an incorrect chord or motion, then a help menu may be displayed describing the possible user error and/or the action associated with the input may be adjusted.

Figure 24:
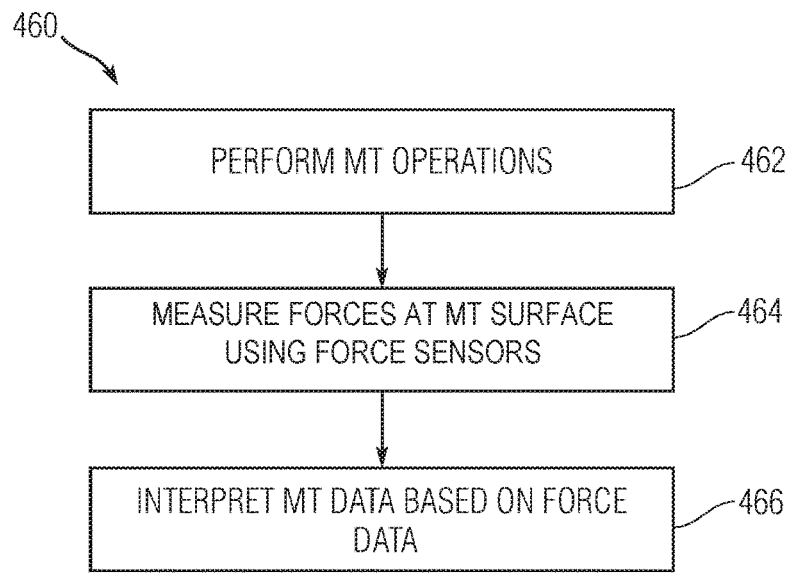
FIG. 24 is an inputting method including force sensing in accordance with one embodiment of the present invention.

FIG. 24 is an inputting method 460, in accordance with one embodiment of the present invention. The method 460 includes block 462 where MT operations are performed. The method 460 also includes block 464 where forces at MT surface are measured during MT operations. The method 466 additionally includes interpreting the MT data based on force data. For example, hard touches may be included in array of contacts while soft touches may be filtered out. Alternatively, force sensing may be used as a way to input. For example, light touches (or hovers) may be used to highlight a function rather than select a function. For example, a light ouch may be used to highlight a virtual key or knob even though the finger is not actual pushed (hard touch)

Figure 25:
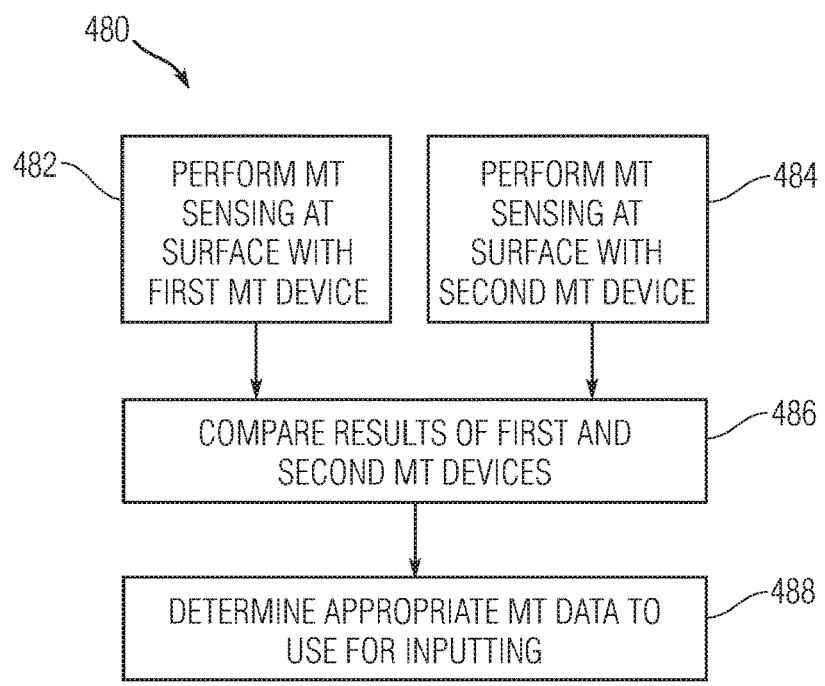
FIG. 25 is an inputting method including capturing and comparing MT data from different devices in accordance with one embodiment of the present invention.

FIG. 25 is an inputting method 480, in accordance with one embodiment of the present invention. The method 480 includes block 482 where MT sensing is performed at a surface with first MT device. The method 480 also includes block 484 where MT sensing is simultaneously performed at the surface with a second MT device. The method 480 additionally includes block 486 where the results of the first and second MT devices are compared in the time domain. The method 480 further includes block 488 where the appropriate MT data to use for inputting is determined. In one example, the two signals are averaged. In another example, one of the signals is selected while the other is disregarded. Other secondary data may be used to interpret both sets of data.

The various aspects, features, embodiments or implementations of the invention described above can be used alone or in various combinations.

Embodiments of the invention are preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While embodiments of this invention have been described in terms of several preferred embodiments, there are alterations, permutations, and equivalents, which fall within the scope of embodiments of this invention. For example, another application for combining camera with MT sensing is enabling 3D hand gestures via the camera if the user has just a part of the hand touching the MT surface at some point during the gesture. This makes the problem of hand gesture recognition via camera easier to solve because you know when a gesture starts or ends. Most demos of hand gesture recognition via a camera require you hit a "start gesture" button. If the start (or end) was just a seamless part of the gesture itself, it could make the feature more attainable on current CPUs. In other applications, the MT surface may be expanded to cover an entire desktop or work space such that multiple users can use the same MT surface at the same time. In cases such as these, the camera may provide additional information including the identity of the persons working at the MT surface. For example, the images may be used to identify the users and then to identify the fingers of each of the users. It should also be noted that there are many alternative ways of implementing the methods and apparatuses of embodiments of the present invention. For example, the secondary sensing modalities may be used as modifiers for the chords and movement data. For example, the secondary sensing modality may change input mode so that the same chord can have different functionality. It is therefore intended that the following appended claims be interpreted as including all such alterations, permutations, and equivalents as fall within the true spirit and scope of embodiments of the present invention.

What is claimed is:

1. A data processing system, comprising:
   a first sensing device configured for receiving a multi-finger gesture input indicative of multiple touch inputs occurring at about the same time and generating first gesture data;
   one or more second sensing devices configured for providing secondary data; and
   a processor coupled to the first sensing device and the one or more second sensing devices, the processor capable of combining both the first gesture data and the secondary data to perform one or more operations on an electronic device,
   wherein the secondary data includes gaze recognition data, and the processor is further capable of
      processing the gaze recognition data to determine when a gaze is directed to an object displayed on a screen, and
      when the gaze is directed to the object, processing the first gesture data in accordance with the gaze recognition data to perform the one or more operations on the electronic device, the one or more operations related to the object at which the gaze is directed.

2. The data processing system of claim 1, the processor further capable of time-aligning the first gesture data and the secondary data and interpreting the combined data in a time-coherent manner.

3. The data processing system of claim 1, the processor further capable of refining the first gesture data in accordance with the secondary data.

4. The data processing system of claim 1, the processor further capable of interpreting the secondary data in accordance with the first gesture data.

5. The data processing system of claim 1, the processor further capable of combining both the first gesture data and the secondary data to create a new command.

6. The data processing system of claim 1, further comprising memory configured for storing a database, the processor further capable of referring to the database in view of the combined first gesture data and secondary data to determine a course of action.

7. The data processing system of claim 1, the processor further capable of:
associating the first gesture data with the object being displayed; and
modifying a characteristic of the displayed object in accordance with the secondary data, the secondary data including data received from an audio sensor.

8. The data processing system of claim 7, the secondary data received from the audio sensor comprising a voice command.

9. The data processing system of claim 1, the one or more second sensing devices including an imaging device configured for generating a hand profile, the processor further capable of correlating the hand profile with the first gesture data to identify fingers associated with the multi-finger gesture input.

10. The data processing system of claim 1, the processor further capable of filtering electronic device motion from the first gesture data.

11. The data processing system of claim 1, the one or more second sensing devices including an orientation sensor for generating orientation data, the processor further capable of interpreting the first gesture data as first data or second data in accordance with the orientation data.

12. The data processing system of claim 1, the one or more second sensing devices including a biometric sensor for determining hand characteristics, the processor further capable of recognizing a trajectory signature from the first gesture data and identifying a user based on the hand characteristics and the trajectory signature.

13. The data processing system of claim 1, the secondary data including emotional data, the processor further capable of analyzing the first gesture data and initiating a corrective action in accordance with the emotional data.

14. The data processing system of claim 1, the one or more second sensing devices including a force sensor for generating force data, the processor further capable of modifying the first gesture data in accordance with the force data.

15. The data processing system of claim 1, the one or more second sensing devices further configured for generating second gesture data, the processor further capable of comparing the first gesture data and the second gesture data in a time domain and determining third gesture data from the comparison.

16. The data processing system of claim 1, the one or more second sensing devices comprising optical sensors.

17. An electronic device comprising the data processing system of claim 1.

18. A method for performing data processing, comprising:
receiving a multi-finger gesture input indicative of multiple touch inputs occurring at about the same time and generating first gesture data;
providing secondary sense data, the secondary sense data including gaze recognition data;
processing the gaze recognition data to determine when a gaze is directed to an object displayed on a screen; and
when the gaze is directed to the object, combining both the first gesture data and the secondary sense data by processing the first gesture data in accordance with the gaze recognition data to perform one or more operations on the electronic device, the one or more operations related to the object at which the gaze is directed.

19. The method of claim 18, further comprising time-aligning the first gesture data and the secondary sense data and interpreting the combined data in a time-coherent manner.

20. The method of claim 18, further comprising refining the first gesture data in accordance with the secondary sense data.

21. The method of claim 18, further comprising interpreting the secondary sense data in accordance with the first gesture data.

22. The method of claim 18, further comprising combining both the first gesture data and the secondary sense data to create a new command.

23. The method of claim 18, further comprising referring to a database in view of the combined first gesture data and secondary sense data to determine a course of action.

24. The method of claim 18, the secondary sense data including audio data, the method further comprising:
associating the first gesture data with the object being displayed; and
modifying a characteristic of the displayed object in accordance with the audio data.

25. The method of claim 24, the audio data comprising a voice command.

26. The method of claim 18, the method further comprising performing the one or more operations on the displayed object in accordance with the gaze recognition data.

27. The method of claim 18, further comprising generating a hand profile as the secondary sense data and correlating the hand profile with the first gesture data to identify fingers associated with contacts established by the first gesture data.

28. The method of claim 18, further comprising filtering electronic device motion from the first gesture data.

29. The method of claim 18, further comprising generating orientation data as part of the secondary sense data and interpreting the first gesture data in accordance with the orientation data.

30. The method of claim 18, further comprising determining hand characteristics as part of the secondary sense data and recognizing a trajectory signature from the first gesture data, and identifying a user based on the hand characteristics and the trajectory signature.

31. The method of claim 18, the secondary sense data including emotional data, the method further comprising analyzing the first gesture data and initiating a corrective action in accordance with the emotional data.

32. The method of claim 18, further comprising generating force data as part of the secondary sense data and modifying the first gesture data in accordance with the force data.

33. The method of claim 18, further comprising generating second gesture data as part of the secondary sense data and comparing the first gesture data and the second gesture data in a time domain and determining third gesture data from the comparison.

34. A non-transitory computer-readable medium comprising program code for performing data processing, the program code for causing performance of a method comprising:
receiving a multi-finger gesture input indicative of multiple touch inputs occurring at about the same time and generating first gesture data;
providing secondary sense data, the secondary sense data including gaze recognition data;
processing the gaze recognition data to determine when a gaze is directed to an object displayed on a screen; and
when the gaze is directed to the object, combining both the first gesture data and the secondary sense data by processing the first gesture data in accordance with the gaze recognition data to perform one or more operations on an electronic device, the one or more operations related to the object at which the gaze is directed.

35. The non-transitory computer-readable medium of claim 34, the program code further for causing performance of a method comprising time-aligning the first gesture data and the secondary sense data and interpreting the combined data in a time-coherent manner.

36. The non-transitory computer-readable medium of claim 34, the program code further for causing performance of a method comprising refining the first gesture data in accordance with the secondary sense data.

37. The non-transitory computer-readable medium of claim 34, the program code further for causing performance of a method comprising interpreting the secondary sense data in accordance with the first gesture data.

38. The non-transitory computer-readable medium of claim 34, the program code further for causing performance of a method comprising combining both the first gesture data and the secondary sense data to create a new command.

39. The non-transitory computer-readable medium of claim 34, the program code further for causing performance of a method comprising referring to a database in view of the combined first gesture data and secondary sense data to determine a course of action.

40. The non-transitory computer-readable medium of claim 34, the secondary sense data including audio data, the program code further for causing performance of a method comprising:
    associating the first gesture data with the object being displayed; and
    modifying a characteristic of the displayed object in accordance with the audio data.

41. The non-transitory computer-readable medium of claim 40, the audio data comprising a voice command.

42. The non-transitory computer-readable medium of claim 34, the program code further for causing performance of a method comprising performing the one or more operations on the displayed object in accordance with the gaze recognition data.

43. The non-transitory computer-readable medium of claim 34, the program code further for causing performance of a method comprising generating a hand profile as part of the secondary sense data and correlating the hand profile with the first gesture data to identify fingers associated with contacts established by the first gesture data.

44. The non-transitory computer-readable medium of claim 34, the program code further for causing performance of a method comprising filtering electronic device motion from the first gesture data.

45. The non-transitory computer-readable medium of claim 34, the program code further for causing performance of a method comprising generating orientation data as part of the secondary sense data and interpreting the first gesture data as first data or second data in accordance with the orientation data.

46. The non-transitory computer-readable medium of claim 34, the program code further for causing performance of a method comprising determining hand characteristics as part of the secondary sense data and recognizing a trajectory signature from the first gesture data and identifying a user based on the hand characteristics and the trajectory signature.

47. The non-transitory computer-readable medium of claim 34, the secondary sense data including emotional data, the program code further for causing performance of a method comprising analyzing the first gesture data and initiating a corrective action in accordance with the emotional data.

48. The non-transitory computer-readable medium of claim 34, the program code further for causing performance of a method comprising generating force data as part of the secondary sense data and modifying the first gesture data in accordance with the force data.

49. The non-transitory computer-readable medium of claim 34, the program code further for causing performance of a method comprising generating second gesture data as part of the secondary sense data and comparing the first gesture data and the second gesture data in a time domain and determining third gesture data from the comparison.

50. A mobile telephone including a data processing system, the data processing system comprising:
    a first sensing device configured for receiving a multi-finger gesture input indicative of multiple touch inputs occurring at about the same time and generating first gesture data;
    one or more second sensing devices configured for providing secondary data, the secondary data including gaze recognition data; and
    a processor coupled to the first sensing device and the one or more second sensing devices, the processor capable of combining both the first gesture data and the secondary data to perform one or more operations on an electronic device;
    wherein the secondary data includes gaze recognition data, and the processor is further capable of
        processing the gaze recognition data to determine when a gaze is directed to an object displayed on a screen, and
        when the gaze is directed to the object, processing the first gesture data in accordance with the gaze recognition data to perform the one or more operations on the electronic device, the one or more operations related to the object at which the gaze is directed.

51. A digital audio player including a data processing system, the data processing system comprising:
    a first sensing device configured for receiving a multi-finger gesture input indicative of multiple touch inputs occurring at about the same time and generating first gesture data;
    one or more second sensing devices configured for providing secondary data, the secondary data including gaze recognition data; and
    a processor coupled to the first sensing device and the one or more second sensing devices, the processor capable of combining both the first gesture data and the secondary data to perform one or more operations on an electronic device;
    wherein the secondary data includes gaze recognition data, and the processor is further capable of
        processing the gaze recognition data to determine when a gaze is directed to an object displayed on a screen, and
        when the gaze is directed to the object, processing the first gesture data in accordance with the gaze recognition data to perform the one or more operations on the electronic device, the one or more operations related to the object at which the gaze is directed.

\* \* \* \* \*